(12) United States Patent
Treat et al.

(10) Patent No.: US 11,750,539 B2
(45) Date of Patent: Sep. 5, 2023

(54) METHOD, APPARATUS, AND COMPUTER PROGRAM PRODUCT FOR GENERATING AN ELECTRONIC ANNOUNCEMENT FOR DISPLAY IN A GROUP-BASED COMMUNICATION INTERFACE

(71) Applicant: Slack Technologies, LLC, San Francisco, CA (US)

(72) Inventors: Albert J. Treat, San Francisco, CA (US); Airat Aminev, Vancouver (CA)

(73) Assignee: Slack Technologies, LLC, San Francisco, CA (US)

(*) Notice: Subject to any disclaimer, the term of this patent is extended or adjusted under 35 U.S.C. 154(b) by 0 days.

(21) Appl. No.: 16/778,464

(22) Filed: Jan. 31, 2020

(65) Prior Publication Data

US 2021/0243142 A1    Aug. 5, 2021

(51) Int. Cl.
*H04L 51/04* (2022.01)
*H04L 51/212* (2022.01)
(Continued)

(52) U.S. Cl.
CPC .......... *H04L 51/04* (2013.01); *H04L 51/212* (2022.05); *H04L 51/216* (2022.05); *H04L 51/224* (2022.05)

(58) Field of Classification Search
CPC ...... G06Q 10/10; G06Q 10/101; G06Q 50/01; G06Q 10/107; H04L 51/00; H04L 51/04; H04L 51/046; H04L 51/12; H04L 51/14; H04L 51/16; H04L 51/24; H04L 51/32; H04L 63/10; H04L 63/101; H04L 63/102;
(Continued)

(56) References Cited

U.S. PATENT DOCUMENTS 10,021,059 B1 * 7/2018 Rao ....................... H04L 51/12
10,331,303 B1 * 6/2019 Gurtin ................. H04L 51/046
(Continued)

OTHER PUBLICATIONS

Anonymous, "Automatic Creation of Communication Channels Around Detected Events", IP.com Prior Art Database, Jan. 5, 2018 (Year: 2018).*
(Continued)

*Primary Examiner* — Vivek Srivastava
*Assistant Examiner* — William C McBeth
(74) *Attorney, Agent, or Firm* — Holland & Hart LLP

(57) ABSTRACT

Various methods and systems for generating an electronic group-based announcement in a group-based communication system. The methods further correspond to receiving an electronic group-based announcement request associated with a user identifier and identifying one or more selected group-based communication channels of the plurality of group-based communication channels associated with the user identifier used to facilitate access control for the electronic group-based announcement in the group-based communication system. The methods further include transmitting the electronic group-based announcement for rendering within group-based communication channel interfaces associated with the identified one or more selected group-based communication channels or an announcement interface element of the group-based communication system, wherein the electronic group-based announcement is rendered based at least in part on publish control parameters.

15 Claims, 17 Drawing Sheets

(51) Int. Cl.
*H04L 51/216* (2022.01)
*H04L 51/224* (2022.01)

(58) Field of Classification Search
CPC ..... H04L 63/104; H04L 51/21; H04L 51/212; H04L 51/214; H04L 51/216; H04L 51/224; H04L 51/52; H04L 51/56
See application file for complete search history.

(56) References Cited

U.S. PATENT DOCUMENTS

| | | | |
|---|---|---|---|
| 10,367,775 B1* | 7/2019 | Lin | H04L 51/32 |
| 10,536,422 B1* | 1/2020 | Rao | H04L 51/212 |
| 10,848,445 B1* | 11/2020 | Willmann | H04L 51/216 |
| 2002/0057284 A1* | 5/2002 | Dalby | G06Q 10/107 715/700 |
| 2005/0021622 A1* | 1/2005 | Cullen | H04L 51/046 709/204 |
| 2006/0173963 A1* | 8/2006 | Roseway | H04L 51/04 709/206 |
| 2011/0196931 A1* | 8/2011 | Clagg | H04L 51/212 709/206 |
| 2012/0221961 A1* | 8/2012 | Reynolds | H04L 51/12 715/752 |
| 2013/0097259 A1* | 4/2013 | Li | H04L 51/226 709/206 |
| 2015/0026604 A1* | 1/2015 | Mulukuri | H04L 51/32 715/758 |
| 2015/0106741 A1* | 4/2015 | Friend | G06Q 10/107 715/752 |
| 2016/0149838 A1* | 5/2016 | Jeong | H04L 51/04 715/753 |
| 2016/0344679 A1* | 11/2016 | Lane | H04L 51/216 |
| 2017/0185278 A1* | 6/2017 | Sundermeyer | G06F 3/04847 |
| 2017/0366491 A1* | 12/2017 | DeLuca | H04L 51/12 |
| 2018/0131660 A1* | 5/2018 | Lambert | H04L 51/32 |
| 2018/0197144 A1* | 7/2018 | Frank | H04L 63/104 |
| 2018/0212903 A1* | 7/2018 | Rose | H04L 51/04 |
| 2018/0260782 A1* | 9/2018 | Bay | H04L 51/56 |
| 2018/0287982 A1 | 10/2018 | Draeger et al. | |
| 2018/0302357 A1* | 10/2018 | Cohen | H04L 51/216 |
| 2018/0367495 A1* | 12/2018 | Kim | H04L 51/32 |
| 2019/0028287 A1* | 1/2019 | Jin | H04L 51/046 |
| 2019/0058680 A1* | 2/2019 | Rosania | H04L 51/216 |
| 2019/0104168 A1* | 4/2019 | Wilson | H04L 67/02 |
| 2019/0190863 A1* | 6/2019 | Baker | H04L 51/212 |
| 2019/0238489 A1* | 8/2019 | Cohen | H04L 51/12 |
| 2020/0026783 A1* | 1/2020 | Watanabe | H04L 51/216 |
| 2020/0125701 A1* | 4/2020 | Isaac | G06F 9/4451 |

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

METHOD, APPARATUS, AND COMPUTER PROGRAM PRODUCT FOR GENERATING AN ELECTRONIC ANNOUNCEMENT FOR DISPLAY IN A GROUP-BASED COMMUNICATION INTERFACE

BACKGROUND

Various messaging systems are available that allow users to have continuous conversations electronically between each other. Applicant has identified a number of deficiencies and problems associated with conventional messaging systems. Through applied effort, ingenuity, and innovation, many of these identified problems have been solved by developing solutions that are included in embodiments of the present disclosure, many examples of which are described in detail herein.

BRIEF SUMMARY

Embodiments of the present disclosure provide methods, apparatus, systems, computing entities, computing entities, and/or the like for generating an electronic group-based announcement in a group-based communication system. In accordance with one aspect, a method is provided. In one embodiment, the method comprises receiving an electronic group-based announcement request associated with a user identifier and identifying one or more selected group-based communication channels of the plurality of group-based communication channels associated with the user identifier used to facilitate access control for the electronic group-based announcement in the group-based communication system. The method further comprises transmitting the electronic group-based announcement for rendering within group-based communication channel interfaces associated with the identified one or more selected group-based communication channels or an announcement interface element of the group-based communication system, wherein the electronic group-based announcement is rendered based at least in part on publish control parameters.

In accordance with another aspect, a computer program product is provided. The computer program product may comprise at least one computer-readable storage medium having computer-readable program code portions stored therein, the computer-readable program code portions comprising executable portions configured to receive an electronic group-based announcement request associated with a user identifier, identify one or more selected group-based communication channels of the plurality of group-based communication channels associated with the user identifier used to facilitate access control for the electronic group-based announcement in the group-based communication system, and transmit the electronic group-based announcement for rendering within group-based communication channel interfaces associated with the identified one or more selected group-based communication channels or an announcement interface element of the group-based communication system, wherein the electronic group-based announcement is rendered based at least in part on publish control parameters.

In accordance with yet another aspect, an apparatus comprising at least one processor and at least one memory including computer program code is provided. In one embodiment, the at least one memory and the computer program code may be configured to, with the processor, cause the apparatus to receive an electronic group-based announcement request associated with a user identifier, identify one or more selected group-based communication channels of the plurality of group-based communication channels associated with the user identifier used to facilitate access control for the electronic group-based announcement in the group-based communication system, and transmit the electronic group-based announcement for rendering within group-based communication channel interfaces associated with the identified one or more selected group-based communication channels or an announcement interface element of the group-based communication system, wherein the electronic group-based announcement is rendered based at least in part on publish control parameters.

BRIEF DESCRIPTION OF THE FIGURES

Reference will now be made to the accompanying drawings, which are not necessarily drawn to scale, and wherein.

DETAILED DESCRIPTION

Figure 1:
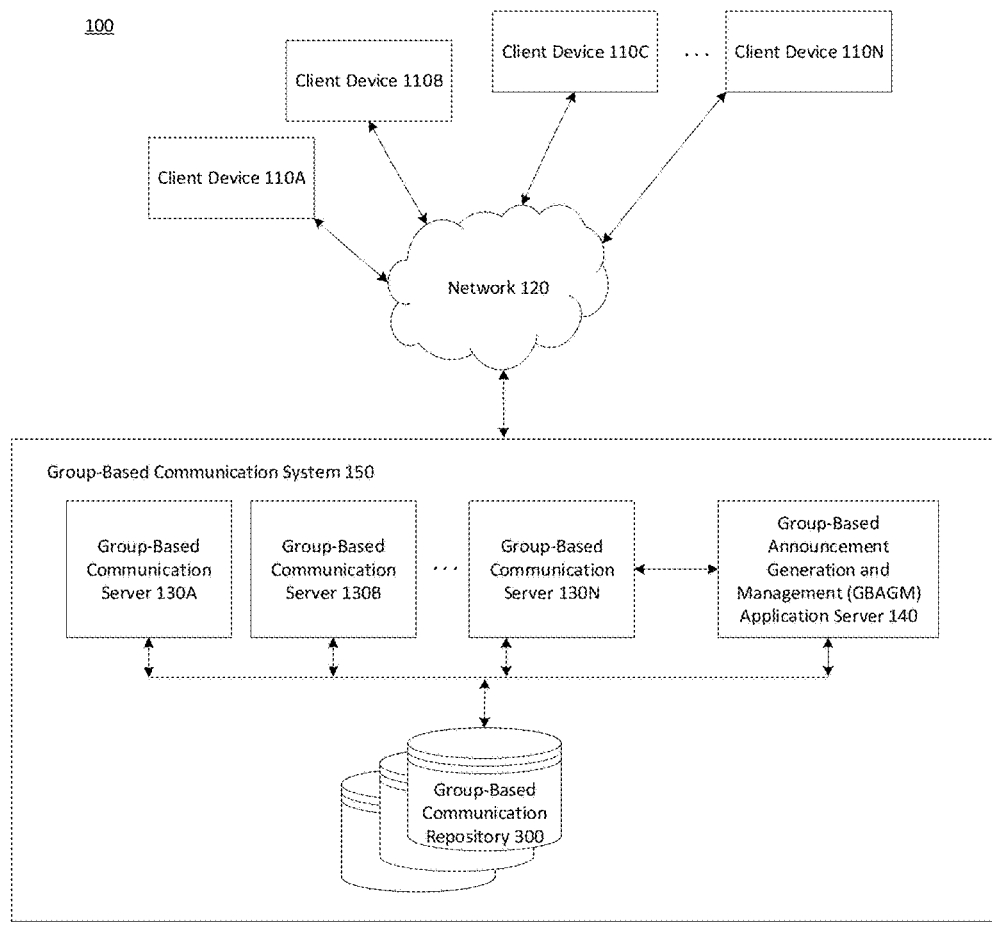
FIG. 1 illustrates an example system in accordance with some embodiments discussed herein.

Some embodiments of the present disclosure will now be described more fully hereinafter with reference to the accompanying drawings, in which some, but not all embodiments of the disclosures are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Definitions

The terms "user identifier" and "profile identifier" refer to one or more items of data by which a user and this user's corresponding user account may be identified within a group-based communication system. For example, a user identifier may comprise ASCII (American Standard Code for Information Interchange) text, a pointer, a memory address, and the like.

The terms "group-based communication channel identifier" or "channel identifier" refer to one or more items of data by which a group-based communication channel may be identified. For example, a group-based communication channel identifier may comprise ASCII ("American Standard Code for Information Interchange") text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like. Group identifiers are used to distinguish group-based communication channels, messages, files, members, etc., of associated with one group-based communication interface from another group-based communication interface. A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) may be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.).

The term "group-based communication system" refers to a communications platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and third party resources.

The term "group-based communication group" may be defined by a system, channel, message, or virtual environment that has security sufficient such that the group-based communication group is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "group-based messaging communication," "message communication," "communication message," and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a timestamp that identifies the time of the message, a group identifier, and a group-based communication channel identifier. Each of the foregoing identifiers may comprise ASCII text, a pointer, a memory address, and the like.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

Thread communication messages are communications received in threads. Otherwise, the group-based messaging communications are generally initiated in channels. A "thread" is a collection of communication messages displayed to a subsidiary feed arising from or otherwise associated with a selected group-based messaging communication displayed in a selected group-based communication channel. A thread may include one or more "threaded messages" or "thread communication messages" that are linked together in the subsidiary feed, wherein each is associated with the selected group-based messaging communication.

A "new messaging communication" or a new communication message is a communication that has not yet been rendered within a group-based communication interface for a particular member (that is, the member viewing the interface).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

In certain embodiments, users may be considered "restricted" users or "ultra-restricted" users of a particular group-based communication channel. Whereas normal, "unrestricted" users may have full read and write access to the group-based communication channel—thereby enabling those users to read messages exchanged via the group-based communication channel and to write new messages for exchange via the group-based communication channel, transform messages into electronic group-based announcements, write new electronic group-based announcements, restricted users may be prevented from writing new messages and/or announcements for exchange via the group-based communication channel, while those users still have read access of messages and/or announcements exchanged via the group-based communication channel. Ultra-restricted users may have further access privileges, for example, based on additional functionality associated with group-based communication channels. For example, restricted users may be enabled to select reactions to exchanged messages, whereas ultra-restricted users may not have reaction-selection privileges for messages within the communication channel. Distinctions between unrestricted, restricted, and ultra-restricted users may be particularly useful in enterprise-wide communication channels having a large number of channel members. Only a subset of the users may be identified as unrestricted users (e.g., for providing enterprise-wide announcements), whereas other users may only have access to read the messages of those unrestricted users, and to select reactions (if enabled).

The terms "group administrator," "group admin," "team administrator," or "team admin" refers to credentials or identifiers associated with user profile that indicate that a client device associated with the user profile may edit access channel settings of respective groups and group-based communication channels having identifiers associated with the user profile. In some embodiments, group administrators transmit channel creation requests to the group-based communication system to create group-based communication channels for a particular group. Users identified as group administrators may edit the access control rights to a group or group-based communication channel which the group is a part of Group administrators may also add users to the group or group-based communication channel which the group is a part of or to invite users to a group or group-based communication channel which the group is a part of. Group administrators may also provide approval prior to transmitting electronic group-based announcements for rendering with the group or group-based communication channel. The access control parameters editable by the group administrator may be limited by the settings set by a super administrator.

The term "electronic group-based announcement" refers to a promoted group-based messaging communication (defined below) provided by a user using a client device and that is configured for display within a group-based communication channel or announcement interface element (defined below), such that the electronic group-based announcement is provided preferential processing and may be selected for presentation in situations where it may otherwise not be (e.g., if not promoted), and electronic group-based announcement may be presented in a manner designed to garner more collective user-attention than the content item would otherwise receive, if presented in a conventional manner (e.g., without having been promoted). Similar to a group-based messaging communication, an electronic group-based announcement transmitted for rendering within a group-based communication channel interface or announcement interface element of the group-based communication system includes metadata comprising the following: a sending user identifier, a message identifier, message contents, a timestamp that identifies the time of the message, a group identifier, and a group-based communication channel identifier. The electronic group-based announcement may further include metadata comprising the following: an expiration that identifies the time of expiration of the electronic group-based announcement, an electronic group-based announcement type (dismissible, non-dismissible, passive), conditions or rules for displaying the electronic group-based announcement (e.g., display at certain date, don't display at certain date, display only on group-based communication channels X, Y, and Z, and/or permit users A, B, and C edit rights, etc.).

The term "electronic group-based announcement request" refers to items of data representing a request for creating a new electronic group-based announcement or transforming a group-based messaging communication to an electronic group-based announcement (e.g., promoting a group-based messaging communication).

The term "announcement interface element" refers to a portion of the group-based communication interface that is configured to support user interaction with a plurality of electronic group-based announcements and support user interaction to create an electronic group-based announcement. In one embodiment, an announcement interface element may be configured to facilitate filtering the electronic group-based announcements using a filtering interface element, which allows selective filtering of the rendered electronic group-based announcements using one or more different types of filters, including filtering by the channel, type, group, expiration date, etc. The announcement interface element may also provide a capability for searching electronic group-based announcements.

Overview

Discussed herein methods, apparatus, systems, computing devices, computing entities, and/or the like for a group-based announcement generation and management (GBAGM) system for generating and/or transmitting electronic group-based announcements for display within various group-based communication channel interfaces and/or an announcement interface element of a client device such that critical electronic group-based announcements may garner a user's attention while non-critical electronic group-based announcements may be ignored or discarded.

Each client device of a group-based communication channel is typically associated with a plurality of group-based communication channels. Each group-based communication channel receives potentially a flurry of message communications on a daily basis. While such messages may be unnecessary and may not relate to a user, many message communications may contain critical information. The volume of critical and non-critical message communications available for presentation to a user far exceeds the amount that a user can practically view and consume. As such, the user may become distracted with the number and appearance of these message communications. In addition, the user may not be aware of the actions to take when a particular message is displayed or provided to the user. As a result, benefits may be realized by providing systems and methods for managing such message communications.

While conventional content management systems may provide ways to filter, organize, or sort message communications, a user may desire some message communications receive a significant level of attention or exposure to users compared to other message communications. A user may further desire that some message communications be presented in a separate location dedicated for displaying only electronic group-based announcements, such as a separate user interface element (e.g., announcement interface element), that is accessible by the user.

The process of creating a message communication and transmitting it to a group of users is very time consuming and cumbersome, especially in situations where message communications frequently involve the same set of users. Additionally, group-based communication channels may be transient in which some users may leave the group-based communication channel. Consequently, a system that addresses these and issues with the dissemination of messaging communications is desired. Indeed, there is a need for the notification of important messaging communications and the ability to confirm that a user has received and/or read such important messaging communications.

In some cases, these messaging communications can contain extensive data, resulting in the transfer of large amounts of data, even potentially redundant data. The data transfers require data storage (i.e., memory on the client device), transmission bandwidth, processing power (i.e., retrieval and conversion to appropriate packets for transmission by a server to the client device), and time.

Accordingly, the present disclosure provides a technological improvement that results in minimizing the amount of data transmitted to and from devices and computing entities within a group-based communication system, while also ensuring the most important and/or relevant data is prioritized for consumption in an interface. In certain embodiments, an existing messaging communication is transformed into an electronic group-based announcement for rendering within group-based communication channel interfaces or an announcement interface element of the group-based communication system. Additionally, when transforming an existing messaging communication into an electronic group-based announcement, transmitting for rendering the electronic group-based announcement, over, for example, a restricted bandwidth network, transmission times can be minimal due to the reduced volume of new data associated with the electronic group-based announcement. Thus, the GBAGM application of the present disclosure provides savings in memory, transmission/network bandwidth, processing power, and time. For example, if a user wants to promote a group-based messaging communication to a plurality of group-based communication channels, the user will need to create in each of the plurality of group-based messaging channels the same electronic group-based announcement (e.g., many electronic group-based announcements to be transmitted to a plurality of group-based messaging channels). To avoid this scenario, the present disclosure facilitates generation of a single electronic group-based announcement that is transmitted for rendering to a plurality of group-based communication channels. Additionally, embodiments of the present invention eliminate the need to provide separate announcement-only channels for each of the plurality of group-based communication channels, which further provides savings in data.

Exemplary System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 shows an example computing system 100 within which embodiments of the present invention may operate. FIG. 1 includes an example network architecture for a system, which may include one or more devices and subsystems that are configured to implement some embodiments discussed herein. For example, computing system 100 may include group-based communication system 150, which can include, for example, the circuitry disclosed in FIGS. 2A and 2B, a server, or database, among other things (not shown). Users may access the group-based communication system 150 via network 120 using client devices 110A-110N. The group-based communication system 150 may include a plurality of group-based communication servers 130A-130N, a plurality of group-based communication repositories 300, and a group-based announcement generation and management (GBAGM) application server 140 accessible via network 120.

Network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 120 may include a cellular telephone, an 802.11, 802.16, 802.20, and/or WiMax network. Further, the network 120 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication system. In some embodiments, the protocol is a custom protocol of JSON objects sent via a websocket channel. In some embodiments, data may be transmitted via a plurality of protocols, such as JSON over RPC, JSON over REST/HTTP, and the like.

The GBAGM application server 140 may include any suitable network server and/or other type of processing device. In some embodiments, the GBAGM application server 140 may interact, via one or more networks 120, with the plurality of client devices 110A-110N as well as the group-based communication system 150 in order to facilitate management of client-initiated electronic group-based announcement requests.

Client devices 110A-110N may be any computing device as defined above. Electronic message data exchanged between the group-based communication servers 130A-130N and the client devices 110A-110N may be provided in various forms and via various methods. In some preferred and non-limiting embodiments, one or more client devices 110A-110N may each be implemented as a personal computer and/or other networked device, such as a cellular phone, tablet computer, or mobile device. In embodiments where a client device 110A-110N is a mobile device, such as a smart phone or tablet, the client device 110A-110N may execute an "app" to interact with the group-based communication servers 130A-130N. Such apps are typically designed to execute on mobile devices, such as tablets or smartphones. For example, an app may be provided that executes on mobile device operating systems such as iOS®, Android®, or Windows 10 Mobile®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 110A-110N, these client devices 110A-110N are configured for communicating with the group-based communication system 150 via one or more websockets or other communication connection.

In some preferred and non-limiting embodiments, the client devices 110A-110N may interact with group-based communication servers 130A-130N via a web browser. The client devices 110A-110N may also include various hardware or firmware designed to interact with the group-based communication servers 130A-130N. Again, via the browser of the client devices 110A-110N, the client devices 110A-110N are configured for communicating with the group-based communication system 150 via one or more websockets or other communication connection.

In some embodiments of an exemplary group-based communication system 150, a message or messaging communication may be sent from a client device 110A-110N to a group-based communication system 150. In various implementations, the message may be sent to the group-based communication system 150 over network 120 directly by a client device 110A-110N, the message may be sent to the group-based communication system 150 via an intermediary such as a message server, and/or the like. For example, the client device 110A-110N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 110A-110N may provide the following example message, substantially in the form of a (Secure) Hypertext Transfer Protocol ("HTTP(S)") POST message including eXtensible Markup Language ("XML") formatted data, as provided below: POST/authrequest.php HTTP/1.1
Host: www.server.com
Content-Type: Application/XML
Content-Length: 667
<?XML version="1.0" encoding="UTF-8"?>
<auth_request>
   <timestamp>2020-12-31 23:59:59</timestamp>
   <user_accounts_details>
   <user_account_credentials>
     <user_name>ID_user_1</user_name>
     <password>abc123</password>
     //OPTIONAL <cookie>cookieID</cookie>
     //OPTIONAL
       <digital_cert_link>www.mydigitalcertificate.com/JohnDoeDaDoeDoe@gmail.com/mycertifcate.dc</digital_cert_link>
     //OPTIONAL <digital_certificate>_DATA_</digital_certificate>
   </user_account_credentials>
   </user_accounts_details>
   <client_details>//iOS Client with App and Webkit
   //it should be noted that although several client details
   //sections are provided to show example variants of client
   //sources, further messages will include only one to save
   //space
   <client_IP>10.0.0.123</client_IP>
   <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
   <client_product_type>iPhone6,1</client_product_type>
   <client_serial_number>DNXXX1X1XXXX</client_serial_number>
   <client_UDID>3XXXXXXXXXXXXXXXXXXXXXXXD</client_UDID>
   <client_OS>iOS</client_OS>
   <client_OS_version>7.1.1</client_OS_version>
   <client_app_type>app with webkit</client_app_type>
   <app_installed_flag>true</app_installed_flag>
   <app_name>MovileSafari app</app_name>
   <app_version>1.0</app_version>
   <app_webkit_name>Mobile Safari</client_webkit_name>
   <client_version>537.51.2</client_version>
   </client_details>
   <client_details>//iOS Client with Webbrowser
   <client_IP>10.0.0.123</client_IP>
   <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
   <client_product_type>iPhone6,1</client_product_type>
   <client_serial_number>DNXXX1X1XXXX</client_serial_number>
   <client_UDID>3XXXXXXXXXXXXXXXXXXXXXXXD</client_UDID>
   <client_OS>iOS</client_OS>
   <client_OS_version>7.1.1</client_OS_version>
   <client_app_type>web browser</client_app_type>
   <client_name>Mobile Safari</client_name>
   <client_version>9537.53</client_version>
   </client_details>
   <client_details>//Android Client with Webbrowser
   <client_IP>10.0.0.123</client_IP>
   <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
   <client_product_type>Nexus S</client_product_type>
   <client_serial_number>YXXXXXXXXZ</client_serial_number>
   <client_UDID>FXXXXXXXXX-XXXX-XXXX-XXXX-XXXXXXXXXXXX</client_UDID>
   <client_OS>Android</client_OS>
   <client_OS_version>4.0.4</client_OS_version>
   <client_app_type>web browser</client_app_type>
   <client_name>Mobile Safari</client_name>
   <client_version>534.30</client_version>
   </client_details>
   <client_details>//Mac Desktop with Webbrowser
   <client_IP>10.0.0.123</client_IP>
   <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
   <client_product_type>MacPro5,1</client_product_type>
   <client_serial_number>YXXXXXXXXZ</client_serial_number>
   <client_UDID>FXXXXXXXXX-XXXX-XXXX-XXXX-XXXXXXXXXXXX</client_UDID>
   <client_OS>Mac OS X</client_OS>
   <client_OS_version>10.9.3</client_OS_version>
   <client_app_type>web browser</client_app_type>
   <client_name>Mobile Safari</client_name>
   <client_version>537.75.14</client_version>
   </client_details>
   <message>
     <message_identifier>ID_message_10</message_identifier>
     <team_identifier>ID_team_1</team_identifier>
     <channel_identifier>ID_channel_1</channel_identifier>
     <contents>That is an interesting disclosure. I have attached a copy our patent policy.</contents>
     <attachments>patent_policy.pdf</attachments>
   </message>
</auth_request>

The group-based communication system 150 comprises group-based communication servers 130A-130N configured to receive and/or disseminate messages transmitted between and/or to a plurality of client devices 110A-110N within a channel identified by a channel identifier and/or a group identifier, and to facilitate dissemination of those messages among client devices 110A-110N that collectively form the membership of the communication channel.

In some embodiments, group-based communication servers 130A-130N may create a storage message based upon the received message to facilitate message indexing and storage in a communication database, as will be described further below. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication servers 130A-130N may provide the following example storage message, substantially in the form of a HTTP(S) POST message including XML-formatted data, as provided below:

```
POST/storage_message.php HTTP/1.1
Host: www.server.com
Content-Type: Application/XML
Content-Length: 667
<?XML version="1.0" encoding="UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
    <topic>disclosures</topic>
    <topic>patents</topic>
    <topic>policies</topic>
    </topics>
    <responses>
    <response>liked by ID_user_2</response>
    <response>starred by ID_user_3</response>
    </responses>
    <contents>That is an interesting disclosure. I have attached a copy our patent policy.</contents>
    <attachments>patent_policy.pdf</attachments>
    <conversation_primitive>
    conversation includes messages: ID_message_8, ID_message_9, ID_message_10, ID_message_11, ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP (Personal Home Page) scripting language commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following: SELECT messageResponses FROM MSM_Message WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication servers 130A-130N). Metadata associated with the message may be determined and the message may be indexed in the group-based communication servers 130A-130N. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). If there are attachments associated with the message, file contents of the associated files may be used to index such files in the group-based communication servers 130A-130N to facilitate searching. In one embodiment, the files may be indexed such that a company's or a group's files are indexed at a separate distributed repository.

In one embodiment, the client devices 110A-110N may be configured to display an interface on a display of the client device for viewing, creating, editing, and/or otherwise interacting with at least one group-based communication channel, which may be provided by the group-based communication servers 130A-130N.

Example Apparatuses Utilized with Various Embodiments

Figure 2A:
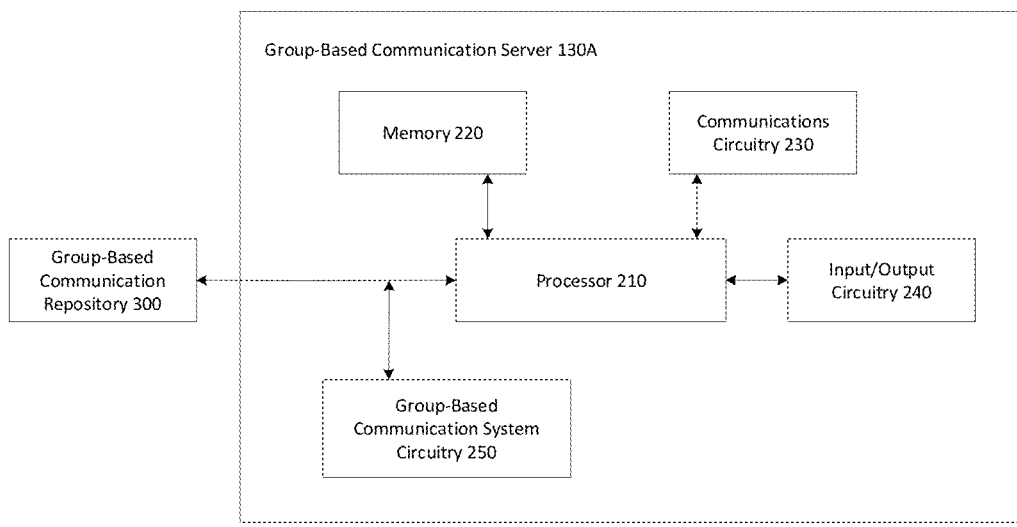
FIG. 2A illustrates a schematic block diagram of an apparatus for use with some embodiments discussed herein.

Each group-based communication server 130A-130N may be embodied by one or more computing systems, such as apparatus 200A shown in FIG. 2A. apparatus 200A can include processor 210, memory 220, communications circuitry 230, and/or input/output circuitry 240. In some embodiments, group-based communication repository 300 may also or instead be included. As referred to herein, "circuitry" includes hardware, software and/or firmware configured to perform one or more particular functions. The apparatus 200A may be configured to execute the operations described herein. Although these components 210-240 are described with respect to functional limitations, it should be understood that the particular implementations necessarily include the use of particular hardware. It should also be understood that certain of these components 210-240 may include similar or common hardware. For example, two sets of circuitries may both leverage use of the same processor, network interface, storage medium, or the like to perform their associated functions, such that duplicate hardware is not required for each set of circuitries.

Processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2A as a single processor, in some embodiments, processor 210 comprises a plurality of processors. The plurality of processors may be embodied on a single computing device or may be distributed across a plurality of computing devices collectively configured to function as apparatus 200A. The plurality of processors may be in operative communication with each other and may be collectively configured to perform one or more functionalities of apparatus 200A as described herein. In an example embodiment, processor 210 is configured to execute instructions stored in memory 220 or otherwise accessible to processor 210. These instructions, when executed by processor 210, may cause apparatus 200A to perform one or more of the functionalities of apparatus 200A as described herein.

Whether configured by hardware, firmware/software methods, or by a combination thereof, processor 210 may comprise an entity capable of performing operations according to embodiments of the present disclosure while configured accordingly. Thus, for example, when processor 210 is embodied as an ASIC, FPGA or the like, processor 210 may comprise specifically configured hardware for conducting one or more operations described herein. Alternatively, as another example, when processor 210 is embodied as an executor of instructions, such as may be stored in memory 220, the instructions may specifically configure processor 210 to perform one or more algorithms and operations described herein.

Memory 220 may comprise, for example, volatile memory, non-volatile memory, or some combination thereof. Although illustrated in FIG. 2A as a single memory, memory 220 may comprise a plurality of memory components. The plurality of memory components may be embodied on a single computing device or distributed across a plurality of computing devices. In various embodiments, memory 220 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 220 may be configured to store information, data (including item data and/or profile data), applications, instructions, or the like for apparatus 200A to carry out various functions in accordance with example embodiments of the present disclosure. Additionally or alternatively, in at least some embodiments, memory 220 is configured to store program instructions for execution by processor 210. Memory 220 may store information in the form of static and/or dynamic information. This stored information may be stored and/or used by apparatus 200A during the course of performing its functionalities.

Communications circuitry 230 may be embodied as any device or means embodied in circuitry, hardware, a computer program product comprising computer readable program instructions stored on a computer readable medium (e.g., memory 220) and executed by a processing device (e.g., processor 210), or a combination thereof that is configured to receive and/or transmit data from/to another device and/or network, such as, for example, apparatus 200A and/or the like. In some embodiments, communications circuitry 230 (like other components discussed herein) can be at least partially embodied as or otherwise controlled by processor 210. In this regard, communications circuitry 230 may be in communication with processor 210, such as via a bus. Communications circuitry 230 may include, for example, an antenna, a transmitter, a receiver, a transceiver, network interface card and/or supporting hardware and/or firmware/software for enabling communications with another computing device. Communications circuitry 230 may be configured to receive and/or transmit any data that may be stored by memory 220 using any protocol that may be used for communications between computing devices. Communications circuitry 230 may additionally or alternatively be in communication with the memory 220, input/output circuitry 240 and/or any other component of apparatus 200A, such as via a bus.

Input/output circuitry 240 may be in communication with processor 210 to receive an indication of a user input and/or to provide an audible, visual, mechanical, or other output to a user (e.g., provider and/or consumer). Some example visual outputs that may be provided to a user by apparatus 200A are discussed in connection with FIGS. 8-16. As such, input/output circuitry 240 may include support, for example, for a keyboard, a mouse, a joystick, a display, a touch screen display, a microphone, a speaker, a radio frequency identification (RFID) technology reader, barcode reader, biometric scanner, and/or other input/output mechanisms. In embodiments where apparatus 200A is embodied as a server or database, aspects of input/output circuitry 240 may be reduced as compared to embodiments where apparatus 200A is implemented as an end-user machine (e.g., consumer device and/or provider device) or other type of device designed for complex user interactions. In some embodiments (like other components discussed herein), input/output circuitry 240 may even be eliminated from apparatus 200A. Alternatively, such as in embodiments wherein apparatus 200A is embodied as a server or database, at least some aspects of input/output circuitry 240 may be embodied on an apparatus used by a user that is in communication with apparatus 200A. Input/output circuitry 240 may be in communication with the memory 220, communications circuitry 230, and/or any other component(s), such as via a bus. One or more than one input/output module and/or other component can be included in apparatus 200A.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 2B:
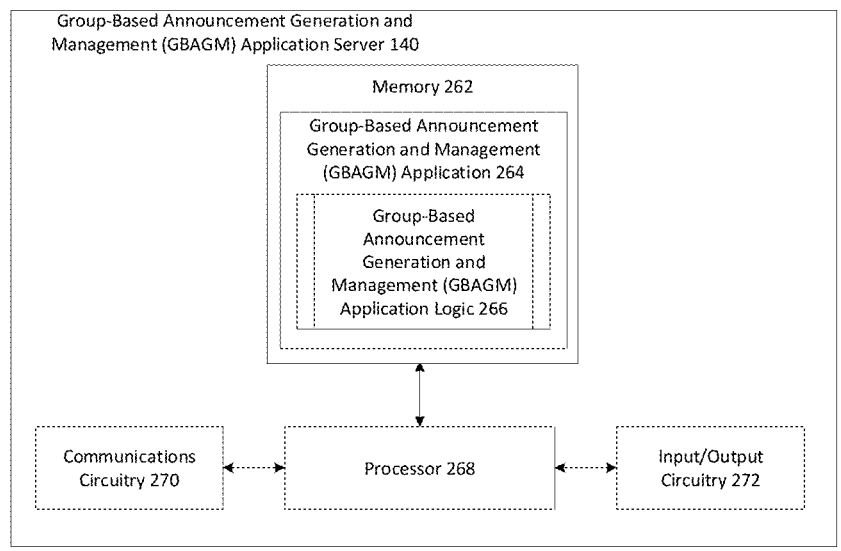
FIG. 2B illustrates a schematic block diagram of an apparatus for use with some embodiments discussed herein.

The Group-Based Announcement Generation and Management (GBAGM) Application Server 140 may be embodied by one or more computing systems, such as apparatus 260 shown in FIG. 2B. Apparatus 260 may be included in, for example, one or more client devices 110A-110N. Any of the aforementioned systems or devices may include the apparatus 260 and may be configured to, either independently or jointly with other devices in a network 120 perform the functions of the apparatus 260 described herein. As illustrated in FIG. 2B, in accordance with some example embodiments, apparatus 260 can includes various means, such as processor 268, memory 262, communications circuitry 270, and/or input/output circuitry 272. As referred to herein, "circuitry," or "interface" includes hardware, software and/or firmware configured to perform one or more particular functions. In this regard, the means of apparatus 260 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 262) that is executable by a suitably configured processing device (e.g., processor 268), or some combination thereof.

Processor 268 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2B as a single processor, in some embodiments, processor 268 comprises a plurality of processors. The plurality of processors may be embodied on a single computing device or may be distributed across a plurality of computing devices collectively configured to function as apparatus 260. The plurality of processors may be in operative communication with each other and may be collectively configured to perform one or more functionalities of apparatus 260 as described herein. In an example embodiment, processor 268 is configured to execute instructions stored in memory 262 or otherwise accessible to processor 268. These instructions, when executed by processor 268, may cause apparatus 260 to perform one or more of the functionalities of apparatus 260 as described herein.

Whether configured by hardware, firmware/software methods, or by a combination thereof, processor 268 may comprise an entity capable of performing operations according to embodiments of the present invention while configured accordingly. Thus, for example, when processor 268 is embodied as an ASIC, FPGA or the like, processor 268 may comprise specifically configured hardware for conducting one or more operations described herein. Alternatively, as another example, when processor 268 is embodied as an executor of instructions, such as may be stored in memory 262, the instructions may specifically configure processor 268 to perform one or more algorithms and operations described herein, such as those discussed in connection with FIGS. 3-6.

Memory 262 may comprise, for example, volatile memory, non-volatile memory, or some combination thereof. Although illustrated in FIG. 2B as a single memory, memory 262 may comprise a plurality of memory components. The plurality of memory components may be embodied on a single computing device or distributed across a plurality of computing devices. In various embodiments, memory 262 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 262 may be configured to store information, data (including item data and/or user account details), applications, instructions, or the like for enabling apparatus 260 to carry out various functions in accordance with example embodiments of the present invention. For example, in at least some embodiments, memory 262 is configured to buffer input data for processing by processor 268. Additionally or alternatively, in at least some embodiments, memory 262 is configured to store program instructions for execution by processor 268. Memory 262 may store information in the form of static and/or dynamic information. This stored information may be stored and/or used by apparatus 260 during the course of performing its functionalities. Memory 262 stores an exemplary group-based announcement generation and management (GBAGM) application 264. The GBAGM application 264 comprises program code for executing a GBAGM application logic 266 as illustrated in FIGS. 3-6.

Communications circuitry 270 may be embodied as any device or means embodied in circuitry, hardware, a computer program product comprising computer readable program instructions stored on a computer readable medium (e.g., memory 262) and executed by a processing device (e.g., processor 268), or a combination thereof that is configured to receive and/or transmit data from/to another device and/or network, such as, for example, a second circuitry and/or the like. In some embodiments, communications circuitry 270 (like other components discussed herein) can be at least partially embodied as or otherwise controlled by processor 268. In this regard, communications circuitry 270 may be in communication with processor 268, such as via a bus. Communications circuitry 270 may include, for example, an antenna, a transmitter, a receiver, a transceiver, network interface card and/or supporting hardware and/or firmware/software for enabling communications with another computing device. Communications circuitry 270 may be configured to receive and/or transmit any data that may be stored by memory 262 using any protocol that may be used for communications between computing devices. Communications circuitry 270 may additionally or alternatively be in communication with the memory 262, input/output circuitry 272 and/or any other component of circuitry, such as via a bus.

Input/output circuitry 272 may be in communication with processor 268 to receive an indication of a user input and/or to provide an audible, visual, mechanical, or other output to a user (e.g., provider and/or consumer). As such, input/output circuitry 272 include support, for example, for a keyboard, a mouse, a joystick, a display, a touch screen display, a microphone, a speaker, a RFID (Radio-frequency identification) reader, barcode reader, biometric scanner, and/or other input/output mechanisms. In embodiments where apparatus 260 is embodied as a server or database, aspects of input/output circuitry 272 may be reduced as compared to embodiments where apparatus 260 is implemented as an end-user machine (e.g., consumer device and/or provider device) or other type of device designed for complex user interactions. In some embodiments (like other components discussed herein), input/output circuitry 272 may even be eliminated from apparatus 260. Alternatively, such as in embodiments wherein apparatus 260 is embodied as a server or database, at least some aspects of input/output circuitry 272 may be embodied on an apparatus used by a user that is in communication with apparatus 260. Input/output circuitry 272 may be in communication with the memory 262, communications circuitry 270, and/or any other component(s), such as via a bus. One or more than one input/output circuitry and/or other component can be included in apparatus 260.

It is also noted that all or some of the information discussed herein can be based on data that is received, generated and/or maintained by one or more components of apparatus 260. In some embodiments, one or more external systems (such as a remote cloud computing and/or data storage system) may also be leveraged to provide at least some of the functionality discussed herein.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows For Generating an Electronic Group-Based Announcement

It will be appreciated that, while the depictions in the following figures include a request/grant occurring between a single client device and the GBAGM application, the present disclosure relates to embodiments wherein the GBAGM application is simultaneously receiving a plurality of such requests, simultaneously (or as near simultaneous as possible) processing them, and granting them, from/to a plurality of disparate client devices in multiple geographic locations.

In embodiments, the group-based communication system 150 is configured to allow users of a group-based communication interface to communicate within group-based communication channels and across group-based communication channels to provide relevant information to other users efficiently and effectively. The group-based communication interface is configured to allow a user to move between group-based communication channels. For instance, a user can search for specific group-based communication channels, highlight specific group-based communication channels to receive notifications or updates regarding messaging communications within the group-based communication channel, create specific group-based communication channels, and create electronic group-based announcements for rendering within group-based communication channel interfaces associated with the identified one or more selected group-based communication channels or an announcement interface element of the group-based communication system. For instance, a user can search for an existing group-based messaging communication to be transformed into an electronic group-based announcement within one or more group-based communication channels and/or an announcement interface element. Thus, an electronic group-based announcement can be presented, rendered, or directly accessed by a group of users or users of the entire group-based communication system without having to access, identify, and manually select recipients (e.g., users receiving or capable of accessing the electronic group-based announcement) from a database of names, user identifiers, and contact information.

Figure 3:
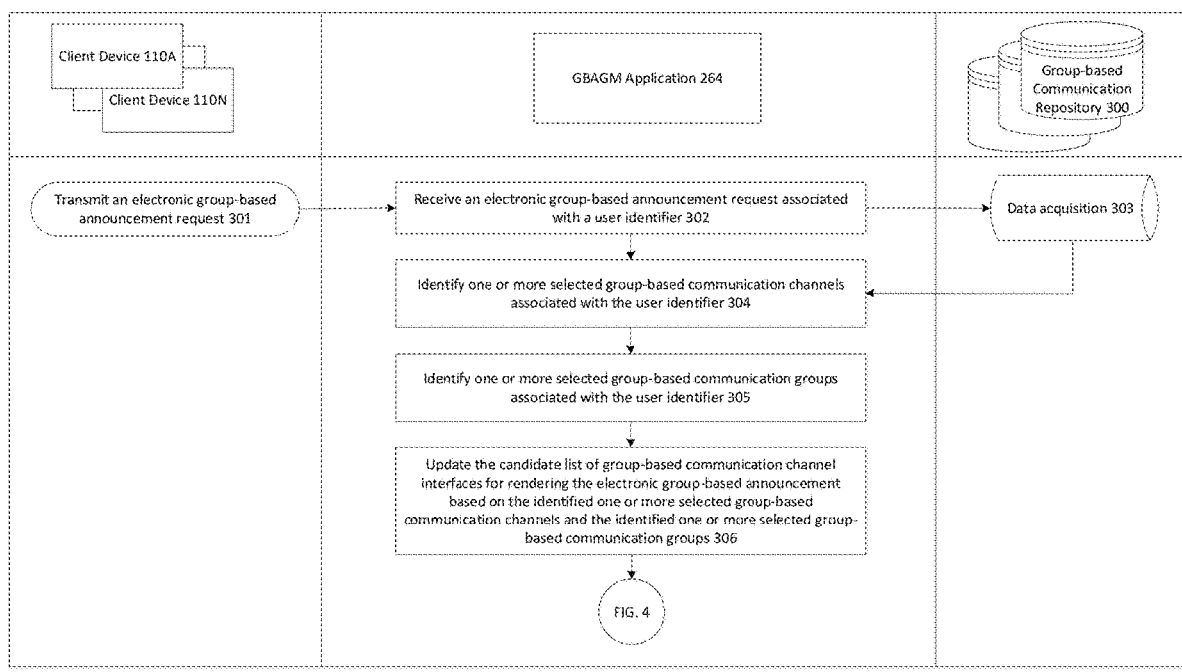
FIGS. 3, 4, and 5, illustrate a schematic view of data transmissions between a client device and a group-based communication system, according to embodiments discussed herein.

FIG. 3 illustrates various interactions between one or more client devices 110A-110N and GBAGM application 264 in a group-based communication system 150 (e.g. a cloud-based group collaboration tool provided by SLACK®) that is able to exchange data in real-time and render an electronic group-based announcement among client devices 110A through a group-based communication channel interface. In particular, the process in FIG. 3 illustrates example operations performed by a GBAGM application 264 for updating a candidate list of group-based communication channel interfaces within a GBAGM interface element (i.e., a graphical user interface) of a client device.

The process illustrated in FIG. 3 starts at step 301, where a client device 110A transmits an electronic group-based announcement request to the GBAGM application 264. In response to receiving the electronic group-based announcement request associated with the user identifier as shown in step 302, the GBAGM application 264 may be configured to operate data acquisition of one or more group-based communication channels and/or group-based communication groups associated with the user identifier of the client device 110A. For example, the user identifier may be extracted from the group-based communication session data associated with client device 110A. Additionally or alternatively, the user identifier may be extracted from a message sent or posted by the client device 110A to a group-based communication channel of the group-based communication system 150.

In embodiments, the user identifier is associated with group-based messaging communications transmitted to one or more of a plurality of group-based communication channels. A user identifier, as described above, is associated with a collection of messages that are transmitted to the group-based communications system 150 by a particular user (i.e., a client device associated with the particular user) intended for posting within a group-based communication channel interface identified by a group-based communication channel identifier associated with the group-based messaging communications.

In some embodiments, upon receipt of the electronic group-based announcement request, the user's authorization credentials for creating an electronic group-based announcement are checked by the GBAGM application 264 to determine whether the particular user is authorized to initiate the creation of the electronic group-based announcement. To check the user's credentials, the GBAGM application 264 retrieves a user record within a data table stored in the group-based communication repository 300. In certain embodiments, data corresponding to the user, including a user profile for the user, may be stored within a database shard of the group-based communication repository 300 corresponding to the particular user. In these and other embodiments, the user profile may be identified by the GBAGM application 264 based on a user identifier included with the electronic group-based announcement request. In certain embodiments, upon determining that the user is not authorized to generate the requested electronic group-based announcement, the GBAGM application 264 transmits a denial message to the client device of the user, which may display the denial request to the user and the process ends.

Upon determining that the user is authorized to generate an electronic group-based announcement, the GBAGM application 264 may generate a GBAGM interface element configured to facilitate creation of an electronic group-based announcement. In certain embodiments, administrators (using respective client devices) may have access to generate electronic group-based announcement requests. In other embodiments, all users (regardless of administrative privileges) may generate electronic group-based announcement requests, although those electronic group-based announcement requests may be subject to the approval of one or more applicable administrative users for a particular group, channel, and/or the announcement interface element of the group-based communication system.

Electronic group-based announcement requests may be generated to create a new electronic group-based announcement or to transform a message into an electronic group-based announcement. The electronic group-based announcement is then transmitted for rendering within group-based communication channel interfaces or an announcement interface element of the group-based communication system.

Figure 8:
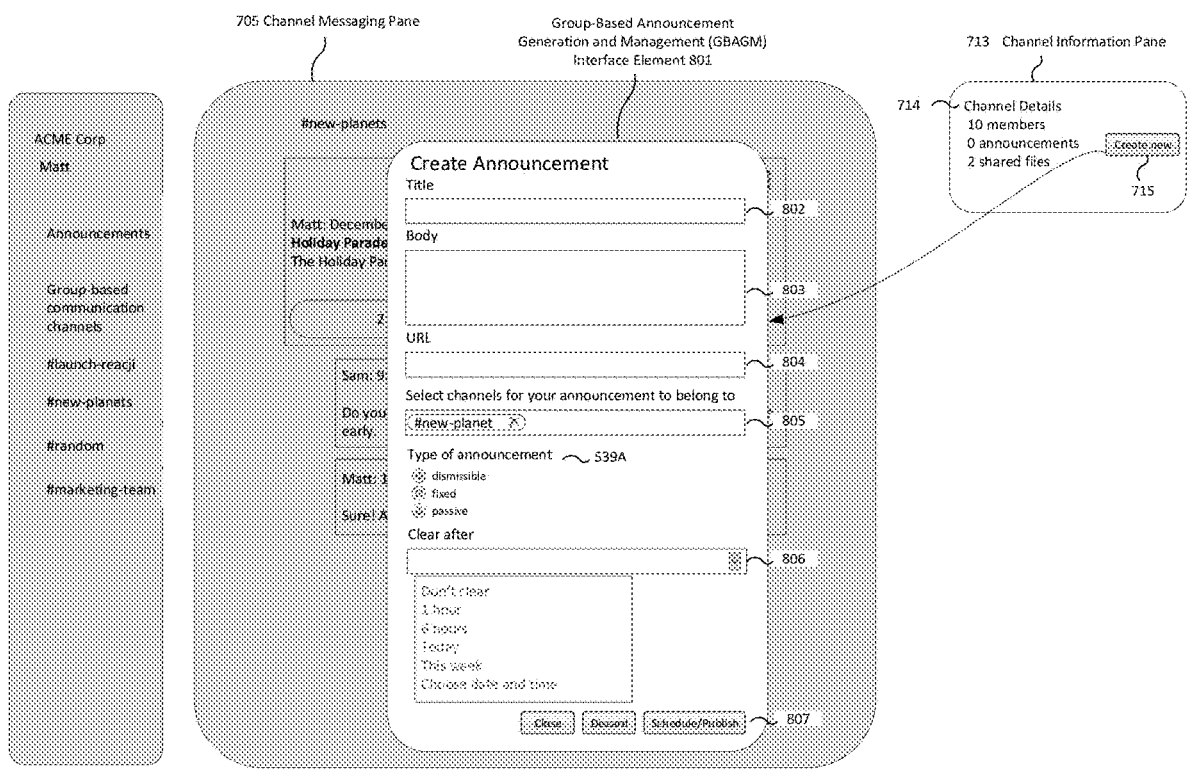
Figure 9:
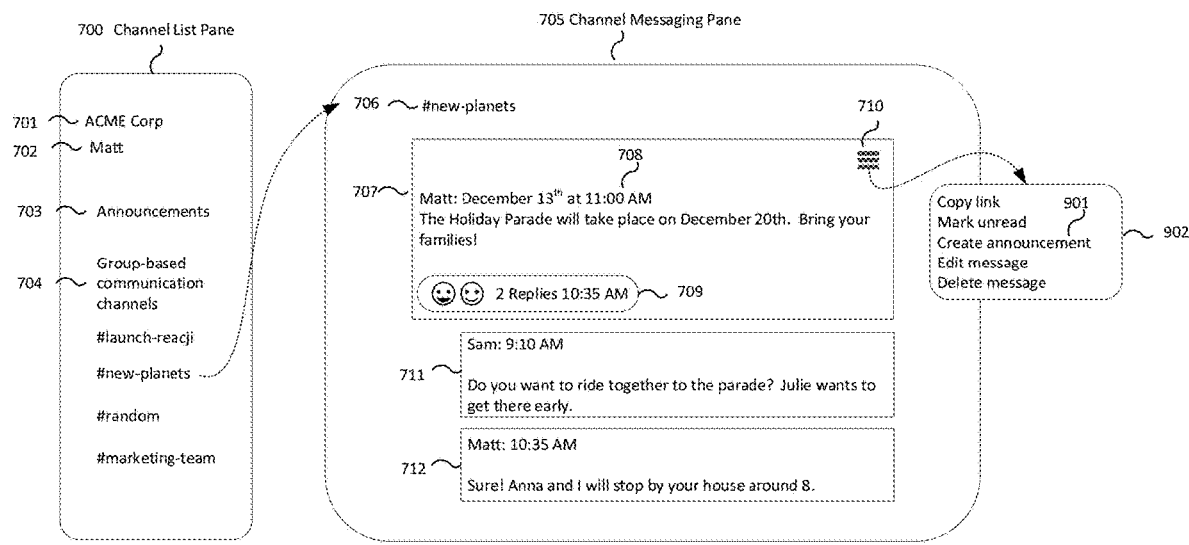

To create a new electronic group-based announcement or to transform a message into an electronic group-based announcement, an electronic group-based announcement request embodied as, for example, GBAGM interface element 801 of FIG. 8 and/or GBAGM interface element 901 of FIG. 9 may be generated at one or more client devices 110A-110N. In certain embodiments, the GBAGM interface element is configured such that client devices 110A-110N may only generate electronic group-based announcement requests for channels associated with the user's associated group(s) and/or channel(s). In such embodiments, the GBAGM interface element is configured for providing a candidate list of group-based communication channel interfaces to the user for which the electronic group-based announcement may be rendered within (this list may comprise all available channels associated with the user, or a subset of channels, for example, complying with a query to search for one or more group-based communication channels associated with the user identifier of the user). The user may provide user input to the client devices 110A-110N selecting one of the displayed channels, which may generate an electronic group-based announcement request for the selected channel. Similarly, the user may provide user input to the client devices 110A-110N selecting one or more group-based communication groups, which may generate an electronic group-based announcement request for group-based communication channels associated with the selected group-based communication groups.

Returning to FIG. 3, the GBAGM application 264 is configured to identify one or more selected group-based communication channels associated with the user identifier as shown in step 304. Additionally or alternatively, the GBAGM application 264 is configured to identify one or more selected group-based communication groups associated with the user identifier as shown in step 305.

In one embodiment, the GBAGM application 264 queries group-based communication repository 300 for one or more selected group-based communication channel and/or groups based on the user identifier. In certain embodiments, when populating the list of candidate list of group-based communication channel interfaces associated with the identified group-based communication channels and/or groups, the GBAGM application 264 generates a composite listing of channels and/or groups, based on a user identifier (e.g., user's membership in group(s) and/or channel(s)). The listing of selected channels and/or groups includes channels and groups that are associated with the user identifier.

In embodiments, identifying one or more selected group-based communication channels of the plurality of group-based communication channels associated with the user identifier comprises determining a user identifier associated with the electronic group-based announcement request, querying the group-based communication repository 300 to identify one or more group-based communication channel identifiers and/or one or more group identifiers associated with the user identifier. The group-based communication repository 300 may include one or more data tables indicative of user account details associated with a particular user identifier, such as group memberships for the user, group-based communication channel memberships for the user, and/or the like. For example, the one or more data tables provides an association between individual users (listed by corresponding unique user identifiers) and teams/groups (identified by unique group identifiers). The one or more data tables may comprise additional data, such as the date/time at which a particular user joined a particular group, and one or more indications of whether a particular user is a group administrator having administrator or ownership privileges for a particular group. Details regarding particular groups may be stored within the group-based communication repository 300. Thus, by referencing the user identifier, the group-based communication repository 300 provides user account details indicative of the user's membership in particular communication channels and/or groups.

Similarly, membership of users within particular group-based communication channels may be established/maintained via one or more data tables found in the group-based communication repository 300. The one or more data tables provides an association between individual users (listed by corresponding unique user identifiers) and group-based communication channels (identified by unique group-based channel identifiers). The one or more data tables may comprise additional data, such as a unique group identifier associated with the channel, a date/time at which a particular user joined a particular group-based communication channel, a date/time the user last read the contents of a group-based communication channel, an indication of whether a particular group-based communication channel is open/currently active on the user's client device, a channel type, an indication as to whether the user's access to a particular group-based communication channel is restricted (and the level of restriction associated with the user's access to a particular group-based communication channel), and/or the like.

The electronic group-based announcement request may identify the user identifier requesting the generation of an electronic group-based announcement. The GBAGM application 264 may thus query the user profile (e.g., stored within the messaging communications database) associated with the user identifier to determine any group-based communication channels and/or group-based communication groups the user is a member of. In embodiments in which the group-based announcement request indicates selection, via the GBAGM interface element 801, of a group-based announcement channel that the user is not a member of, the GBAGM application 264 may further transmit an authorization request to the administrator of the channel to determine whether the electronic group-based announcement should be approved for rendering within the channel.

In step 306, the GBAGM application 264 is thus configured to update the candidate list of group-based communication channel interfaces for rendering the electronic group-based announcement based on the identified one or more selected group-based communication channels and the identified one or more selected group-based communication groups.

Figure 4:
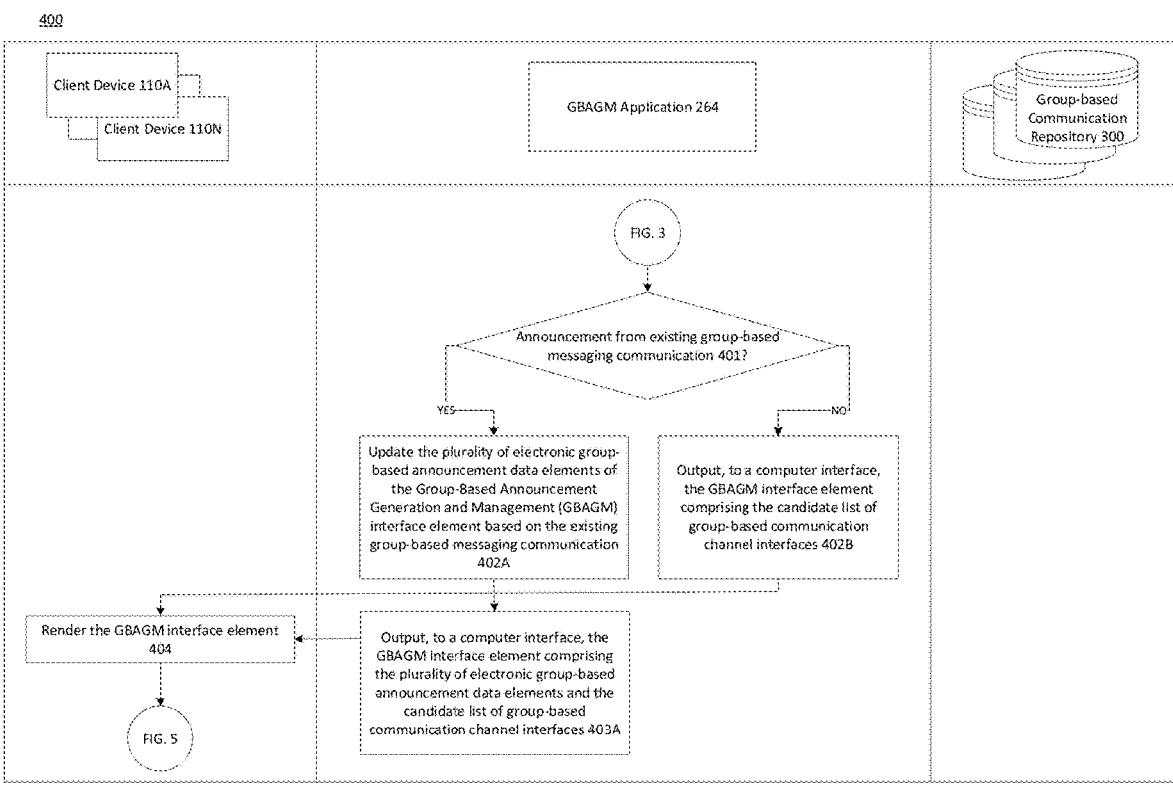

FIG. 4 illustrates the subsequent operations for rendering a GBAGM interface element in response to the electronic group-based announcement request, the operations proceeding to follow FIG. 3 in reference to connector 3. In one example, FIG. 8 a rendered GBAGM interface element comprising various electronic group-based announcement data elements, such example support user data elements include the title, body, candidate list of group-based communication channels (e.g., list of channels to which the announcement will be transmitted for rendering to respective group-based communication channel interfaces), type of announcement (e.g., dismissible, fixed, passive), and an access interval time indicative of a time period during which the announcement is to be available for access control before the announcement is deleted and no longer accessible.

Before outputting GBAGM interface element, the GBAGM application 264 determines whether the announcement (e.g., electronic group-based announcement request) is from an existing group-based messaging communication as shown in step 401. For example and as shown in FIG. 9, for example, group-based messaging communication 707 is available on the communication channel interface. That is, group-based messaging communication 707 may either be stored in group-based communication repository 300, for example. The message in FIG. 9 includes, for instance, a sender, a title, a body, and an associated group-based communication channel (e.g., #new-planets) for reference by the GBAGM application 264. At least one concept disclosed herein provides a method in which a user is provided with assisted transformation of a message into an electronic group-based announcement comprising the data associated with the message.

Figure 10:
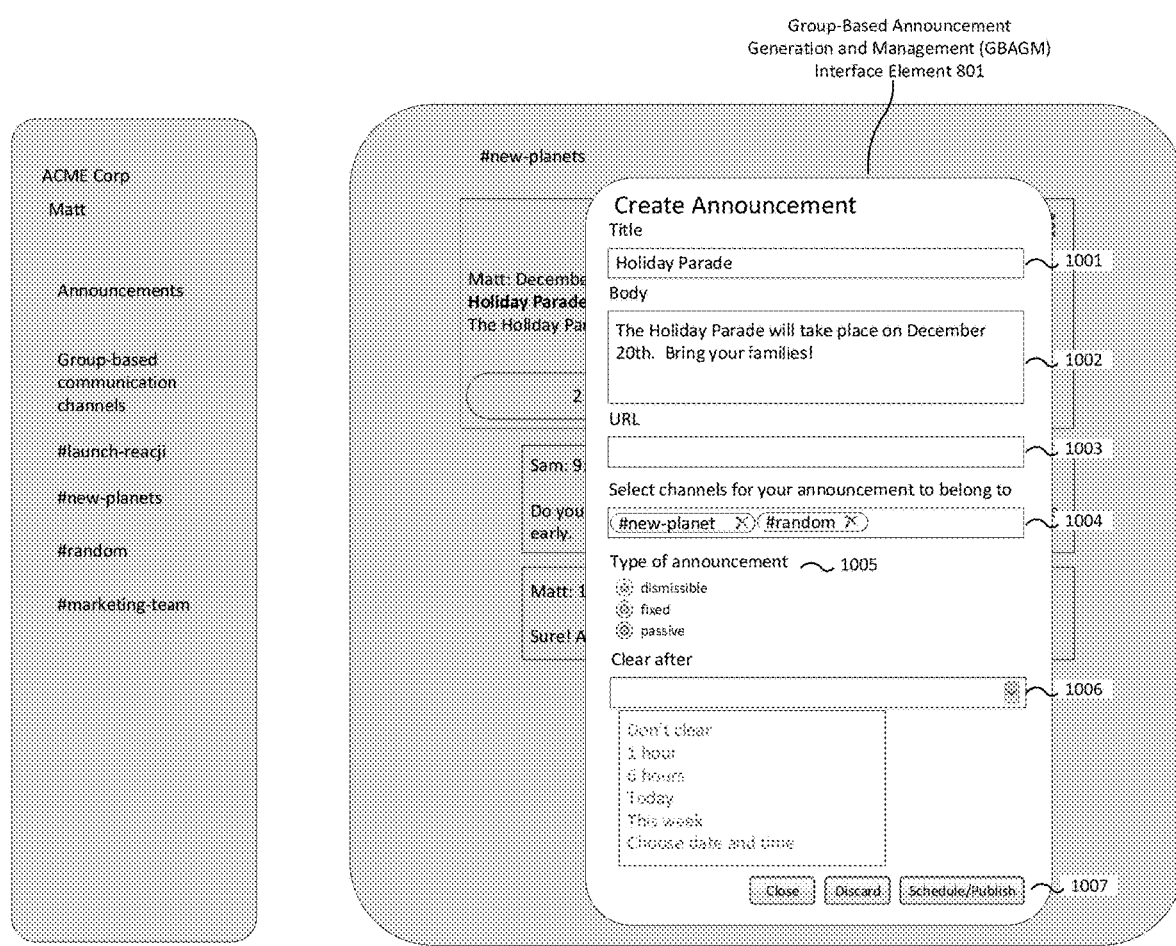

If the outcome of step 401 is a "YES" determination, the GBAGM application 264 is configured to update the plurality of electronic group-based announcement data elements of the GBAGM interface element based on the existing group-based messaging communication as shown by step 402A. In step 403A, the GBAGM application 264 is further configured to output, to a computer interface, the GBAGM interface element comprising the plurality of electronic group-based announcement data elements and the candidate list of group-based communication channel interfaces. In this case, one or more of the electronic group-based announcement data elements are prefilled with data from the existing messaging communication. As follows in step 404, the GBAGM application 264 renders the GBAGM interface element, such as the GBAGM interface element 801 shown in FIG. 10. As seen in FIG. 10, the GBAGM interface element 801 includes the title 10001, the body 1002, and the candidate list of group-based communication channel interfaces 1004 as well as other elements described in further detail below with reference to FIG. 10. The title 1001, body 1002, and the candidate list of group-based communication channel interfaces 1004 are prefilled based at least in part on the existing group-based messaging communication 707 of FIG. 9 and the user identifier.

In step 402B, the GBAGM application 264 may be configured to output, to a computer interface, the GBAGM interface element comprising the candidate list of group-based communication channel interfaces in an instance when the outcome of step 401 is a "NO" determination. In step 404, the GBAGM application 264 renders the GBAGM interface element, such as the GBAGM interface element 801 shown in FIG. 8. As seen in FIG. 8, the GBAGM interface element 801 includes the candidate list of group-based communication channel interfaces 805 prefilled with a group-based communication channel (e.g., #new-planet) associated with the user identifier of the electronic group-based announcement request. In step 404, the GBAGM application 264 renders the GBAGM interface element, such as the GBAGM interface element 801 shown in FIG. 8.

Figure 5:
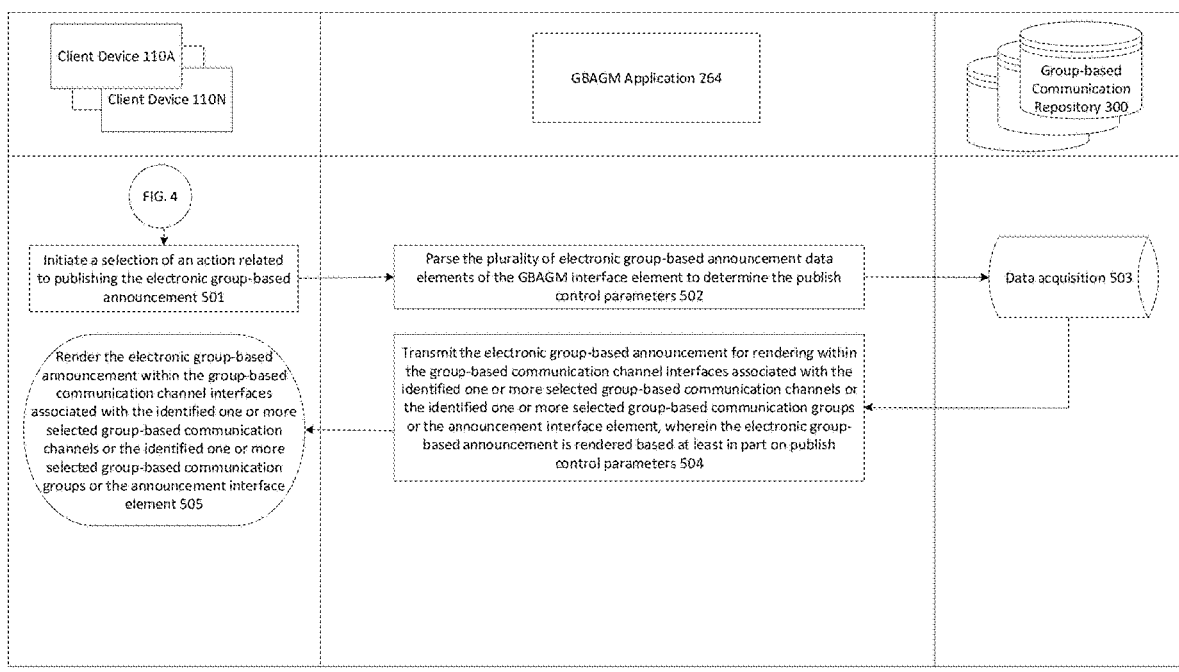

FIG. 5 illustrates the subsequent operations for rendering the electronic group-based announcement within the group-based communication channel interfaces associated with the identified one or more selected group-based communication channels or the identified one or more selected group-based communication groups or the announcement interface element, the operations proceeding to follow FIG. 4 in reference to connector 4. In step 501, the client device 110A initiates a selection of an action related to publishing the electronic group-based announcement (e.g., selection of the "schedule/publish" action 1007 as depicted in FIG. 10. In step 502, the GBAGM application 264 is configured for parsing the plurality of electronic group-based announcement data elements of the GBAGM interface element to determine the publish control parameters.

In parsing the plurality of electronic group-based announcement data elements of the GBAGM interface element to determine the publish control parameters, the GBAGM application 264 may be configured to operate data acquisition (step 503) of one or more group-based communication channel data and/or group-based communication group data associated with the user identifier of the client device such as client device 110A and the candidate list of group-based communication channel interfaces.

In step 504, the GBAGM application 264 transmits the electronic group-based announcement for rendering within the group-based communication channel interfaces associated with the identified one or more selected group-based communication channels or the identified one or more selected group-based communication groups or the announcement interface element, wherein the electronic group-based announcement is rendered based at least in part on publish control parameters.

In step 505, the GBAGM application 264 renders the electronic group-based announcement within the group-based communication channel interfaces associated with the identified one or more selected group-based communication channels or the identified one or more selected group-based communication groups or the announcement interface element.

In embodiments, the GBAGM application 264 determines whether the requested electronic group-based announcement data elements comply with applicable publish control parameters. For example, the GBAGM application 264 retrieves applicable publish control parameters for the electronic group-based announcement request. The GBAGM application 264 identifies one or more selected group-based communication groups and/or one or more selected group-based communication channels associated with the user identifier within the electronic group-based announcement request, and looks up applicable publish control parameters via one or more data tables. Upon identifying applicable publish control parameters, the GBAGM application 264 retrieves those publish control parameters from the group-based communication repository 300, and compares those publish control parameters against the requested electronic group-based announcement data elements or attributes identified within the electronic group-based announcement request. In certain embodiments, the GBAGM application 264 may automatically adjust one or more announcement data elements to comply with announcement-specific policies (upon determining that those announcement data elements are not in compliance with applicable announcement publish control parameter policies). The GBAGM application 264 may further provide an indication of the changed announcement data elements to the requesting client device for presentation to the user. In other embodiments, the GBAGM application 264 may request that the user adjust any announcement data element that is not in compliance with applicable publish control parameters prior to proceeding to transmit the electronic group-based announcement for rendering with the group-based communication channel interfaces or the announcement interface element.

In an example embodiment, the publish control parameters comprises a start time and an end time for access to the electronic group-based announcement. For example, the start time may refer to the time that the GBAGM application 264 accepts access control for an electronic group-based announcement (e.g., access to the announcement, such as having the announcement return as part of search results in response to a search query). The end time may refer to the time when the GBAGM application 264 terminates the time of accessing the electronic group-based announcement.

In another example embodiment, the publish control parameters comprises a read announcement notification indicating that the electronic group-based announcement has been read by each channel member of the identified one or more selected group-based communication channels or each user of the announcement interface element of the group-based communication system. For example, when a user viewed the electronic group-based announcement or read details about the electronic group-based announcement, GBAGM application 264 may automatically send a read announcement notification to the user or administrator associated with the electronic group-based announcement request indicating that the notification was viewed/read. This read receipt is stored by the GBAGM application 264 and associated with the electronic group-based announcement, allowing other users to query the stored data and identify who was made aware of a particular announcement and at what time each user became aware of the particular announcement.

Figure 6:
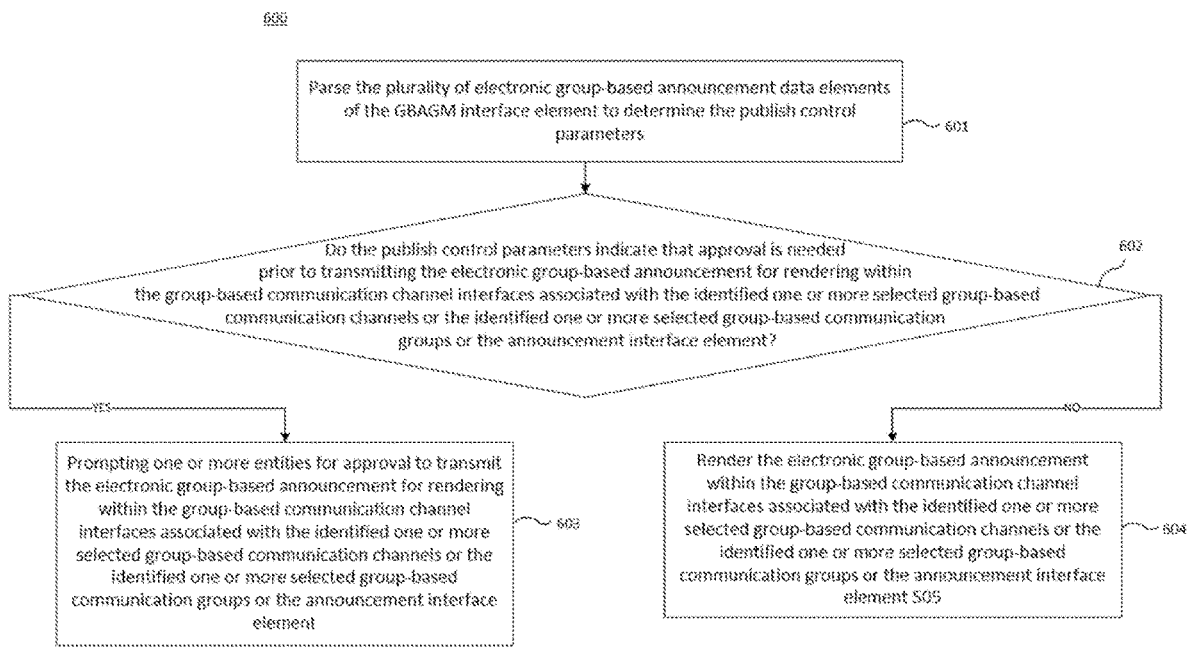
FIG. 6 illustrates a flowchart of example operations performed by a group-based announcement generation and management application of a group-based communication system according to embodiments of the present disclosure.

In yet another example embodiment, the publish control parameters may further comprise approval information representing one or more entities whose approval is needed prior to transmitting the electronic group-based announcement for rendering within the group-based communication channel interfaces associated with the identified one or more selected group-based communication channels or the announcement interface element of the group-based communication system. As shown in FIG. 6, the GBAGM application 264 may parse the plurality of electronic group-based announcement data elements of the GBAGM interface element to determine the publish control parameters as shown in step 601. The GBAGM application 264 may then determine whether the publish control parameters indicate that approval is needed prior to transmitting the electronic group-based announcement for rendering within the group-based communication channel interfaces associated with the identified one or more selected group-based communication channels or the identified one or more selected group-based communication groups or the announcement interface element, as shown in step 602.

If the outcome of step 602 is a "YES" determination, the GBAGM application 264 is configured to prompt one or more entities for approval to transmit the electronic group-based announcement for rendering within the group-based communication channel interfaces associated with the identified one or more selected group-based communication channels or the identified one or more selected group-based communication groups or the announcement interface element.

In step 604, the GBAGM application 264 may be configured to render the electronic group-based announcement within the group-based communication channel interfaces associated with the identified one or more selected group-based communication channels or the identified one or more selected group-based communication groups or the announcement interface element in an instance when the outcome of step 602 is a "NO" determination.

In certain embodiments, the GBAGM application 264 may further determine whether the user requesting to create the electronic group-based announcement is an administrator associated with the group-based communication channel or the announcement interface element to which the requested electronic group-based announcement is to be rendered. For example, the GBAGM application 264 may retrieve data from the group-based communication repository 300 to identify a user identifier indicated as being an administrator for the group, the channel, and/or the announcement interface element. The GBAGM application 264 may then compare the user identifier received as a part of the electronic group-based announcement request against the user identifier indicated as being the administrator for the applicable group, channel, and/or announcement interface element. Upon determining that the user is not an administrator, the GBAGM application 264 may transmit an approval request to the identified group administrator to approve or deny the electronic group-based announcement request. If the administrator denies the electronic group-based announcement request, the process may end. However, if the administrator approves the electronic group-based announcement request, the process proceeds as discussed herein.

In certain embodiments, different criteria may apply to determine whether the electronic group-based announcement is authorized for rendering within a group-based communication channel as opposed to or in addition to rendering within the announcement interface element. Accordingly, when determining whether the electronic group-based announcement is transmitted for rendering within the group-based communication channel interfaces associated with the identified one or more selected group-based communication channels or the identified one or more selected group-based communication groups or the announcement interface element of the group-based communication system, the GBAGM application 264 may query a group-based communication system-specific set of target criteria for determining whether the electronic group-based announcement interface is authorized to render within the group-based communication channel interfaces associated with the identified group-based communication channels or the identified one or more selected group-based communication groups or the announcement interface element (e.g., the target criteria may include a whitelist of a blacklist of users identified as authorized to generate an announcement for rendering within the announcement interface element, or users identified as unauthorized to generate an announcement for rendering within the announcement interface element; or the target criteria may include a predetermined keyword that indicates authorized rendering of the announcement to the announcement interface element). For example, the predetermined keyword may be one or more words such as "URGENT," "UPDATE," "ANNOUNCEMENT," "FIRE," "ACCIDENT," "EMERGENCY," "ACTION REQUIRED," or "NOTIFICATION ALERT." The keyword can be assigned and stored in advance by an owner/administrator of the channel, group, or announcement interface element. In this example embodiment, the GBAGM application 264 may use this information as input as to whether or not to transmit the announcement for rendering within the group-based communication channel interfaces associated with the identified one or more selected group-based communication channels or the identified one or more selected group-based communication groups or the announcement interface element. For example, in FIG. 13, the electronic group-based announcement 1301 includes a predetermined keyword, for example, "Remodel Update," to initiate transmission for rendering the electronic group-based announcement 1301, at the group-based communication channel 706. The GBAGM application 264 receives the keyword (e.g., group-based messaging communication data element) from the electronic group-based announcement request and is configured to determine whether or not the received group-based messaging communication data element (e.g., keyword "remodel update") matches the predetermined keyword or is satisfied. If the data element is determined to match the predetermined keyword or is determined to be satisfied by the predetermined keyword, the GBAGM application 264 transmits the electronic group-based announcement for rendering to the group-based communication channel 706 (e.g. "announcements" channel).

Dynamic UI

Figure 7:
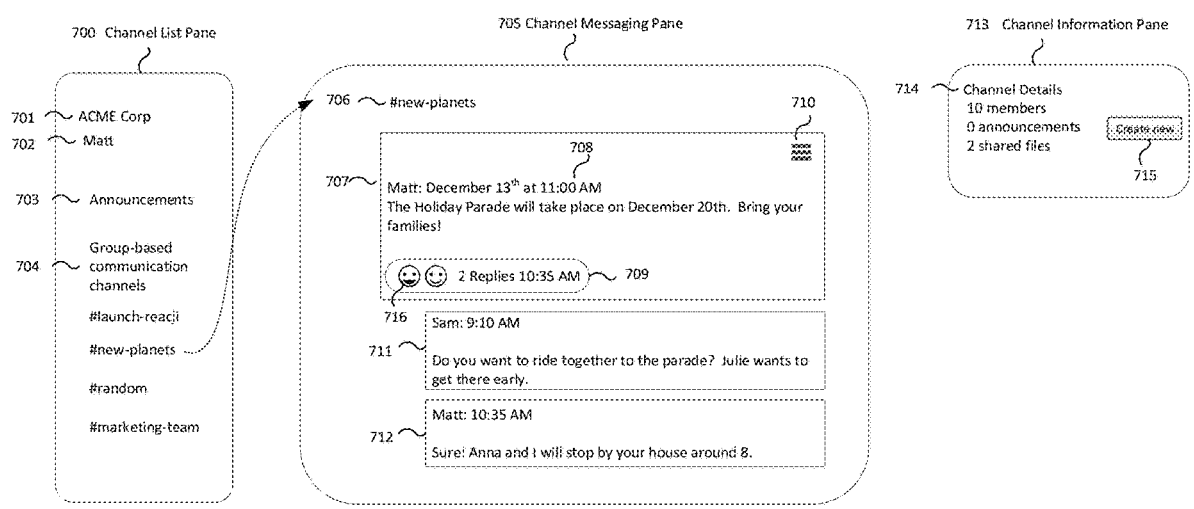
FIGS. 7, 8, 9, 10, 11, 12, 13, 14, 15, and 16 illustrate example group-based communication interfaces in accordance with some embodiments discussed herein.

FIG. 7 is an example group-based communication interface having a channel list pane 700, channel messaging pane 705, and channel information pane 713 in accordance with some embodiments discussed herein. The channel list pane 700 includes an announcement thread indication 703 (e.g., identifying the announcement interface element that the user follows), communication channel indications 704 (e.g., identifying channels that the user follows), the name of the group 701 ("ACME Corp"), and the name of the particular member 702 ("Matt") viewing the interface. As shown in FIG. 7, the group-based communications interface may be configured to display the channel list pane 700, channel messaging pane 705, and channel information pane 713 simultaneously.

The channel messaging pane 705 includes group-based communication channel 706 ("new-planets") which includes a feed of group-based messaging communications 707, 711, and 712. Each group-based messaging communications 707, 711, and 712 includes messaging communication information. The messaging communication information includes a profile identifier and the time and date of receipt of the respective group-based messaging communication. The channel information pane 713 may include other identifying information for the group-based communication channel (e.g., members of communication channel, number of electronic group-based announcements, number of shared files, etc.) and an electronic group-based announcement creation actuator button 715, which enables a user input that comprises a request to create a new electronic group-based announcement. The user input comprises any of a click, finger tap, a series of key strokes on a keyboard, voice commands, or the like.

As shown in FIG. 7, the channel messaging pane 705 also includes a message actuator 710. The message actuator 710 is configured to initiate an electronic group-based announcement request to create an electronic group-based announcement which is described in further detail with respect to FIG. 9.

In the embodiment illustrated in FIG. 7, the channel messaging pane 705 includes a thread summary indicator 709 which includes the number of thread communication messages received in the respective thread ("2 Replies") (i.e., the thread count), a profile identifier (e.g., avatar 716) associated with the member who submitted the thread communication message(s), and include a latency indicator ("10:35 AM") that indicates the time of receipt for the latest thread communication message in the thread. Such information can be beneficial to members of the group-based communication channel in determining whether to access and view the thread. A variety of information can be displayed in the thread summary indicators.

The thread summary indicator 709 can be configured as a selected thread view actuator to initiate a selected thread view request. The group-based communication interface is configured to receive selected thread view requests and in response to receipt of selected thread view requests, present each of the group-based messaging communications from which the respective thread was created (e.g., group-based messaging communications 711 and 712). In this embodiment, the group-based messaging communications 711 and 712 are ordered in reverse chronological order, displaying the thread with the most recent thread communication message first. The threads may be organized in a variety of manners in the channel messaging pane 705. In the embodiment illustrated in FIG. 7, a thread has been created from the group-based messaging communication 707 (as shown for instance by the thread summary indicator 709) that is displayed in the channel messaging pane 705.

Electronic Group-Based Announcement Creation

In the embodiment illustrated in FIG. 8, an electronic group-based announcement request is initiated (as shown for instance by the GBAGM interface element 801) that may be overlaid onto the channel messaging pane 705. The electronic group-based announcement request was initiated by a user selecting the electronic group-based announcement creation actuator button 715, which initiated an electronic group-based announcement request. As shown by FIG. 8, the user requests to create an electronic group-based announcement via the GBAGM interface element 801, and the user provides various group-based messaging communication data elements or characteristics, such as title 802, body 803, URL 804 (uniform resource locator), candidate group-based communication channels (e.g., group-based communication channel interfaces associated with the identified group-based communication channels or the identified group-based communication groups to which the electronic group-based announcement will be transmitted to for rendering), type of announcement (e.g., dismissible, fixed, passive), an access interval time indicative of a time period during which the announcement is to be available for access control before the announcement is deleted and no longer accessible. For example, the GBAGM application may have a policy or publish control parameters that the announcement is to be available for 6 hours. As such, the announcement will be cleared, deleted, inaccessible after 6 hours the announcement is transmitted for rendering. The GBAGM interface element 801 further comprises a "Close" button for closing the GBAGM interface element 801, a "Discard" button to clears input boxes 802-806 associated with the electronic group-based announcement data elements and a "schedule/publish" actuator 807 for submitting the electronic group-based announcement request to the GBAGM application for rendering.

Upon receipt of user input for each of the group-based messaging communication data elements, the GBAGM application may then identify one or more selected group-based communication groups and/or one or more selected group-based communication channels associated with the user identifier to facilitate access control for the electronic group-based announcement. Upon receipt of the electronic group-based announcement request, the user's authorization credentials for generating an electronic group-based announcement for rendering to one or more candidate group-based communication channel interfaces is checked to determine whether the user is authorized to initiate the creation of the announcement for rendering within the requested candidate group-based communication channel interface associated with the identified group-based communication channel and/or group-based communication group or the announcement interface element (it should be understood that certain users may be authorized to initiate the creation of electronic group-based announcement for rendering within particular channels but not to initiate the creation of electronic group-based announcement within the announcement interface element).

In the embodiment illustrated in FIG. 9, an electronic group-based announcement request is initiated by a user selecting message actuator 710. Upon selecting the message actuator 710, a message actions interface element 902 is shown overlaid the channel messaging pane 705. The message actions interface element 902 includes various actions that may be performed on an associated group-based messaging communication, such as copy a link associated with the message, marking the message unread, creating or transforming the message into an electronic group-based announcement 901, editing the message or deleting the message. Transitioning now to FIG. 10, the electronic group-based announcement request was initiated by a user selecting the electronic group-based announcement creation actuator associated with creating or transforming the message into an electronic group-based announcement 901. In response the user selection, the GBAGM application may display the GBAGM interface element 801 as shown in FIG. 10. Similar to the GBAGM interface element 801 shown in FIG. 8, the user may input various group-based messaging communication data elements (e.g., input boxes 1001-1007). In this example embodiment, the GBAGM application may pre-fill one or more of the input boxes 1001-1007 based on the existing group-based communication message the announcement is based on. As shown in FIG. 10, the title 1001, body 1002, group-based communication channel 1004 are pre-filled using data from group-based messaging communication 707 from FIG. 9. Other input fields such as the URL 1003, type of announcement 1005, access interval time 1006 may not be pre-filled. In some embodiments, the GBAGM application may verify data entered and/or pre-filled in the input boxes 1001-1007 by comparing the data to data rules and/or format requirements. For example, data or information such as body 1002 and group-based communication channel 1004 may be acceptable for processing by the GBAGM application only if it is complete (i.e., all required fields are filled), and if it conforms to preset formats. Preset formats may require a particular character attribute or symbol (e.g. hashtag symbol) or minimum numbers of characters (e.g. a complete body 803). Incomplete or incorrect information triggers an error message to be displayed to the user. The error message may identify any deficiencies in the data. The GBAGM interface element 801 further comprises a "Close" button for closing the GBAGM interface element 801, a "Discard" button to clears input boxes 1001-1006 and a "Schedule/Publish" action 1007 for submitting the electronic group-based announcement request to the GBAGM application.

In some embodiments, the GBAGM application may be further configured to compare the group-based messaging communication data element against data elements associated with rendered electronic group-based announcements and in response to a determination that the electronic group-based announcement comprises potentially duplicate content based on the comparison, transmit information identifying that the electronic group-based announcement and the rendered electronic group-based announcements comprise potentially duplicate content. Such a comparison may occur to avoid processing announcements that are clearly duplicates.

Rendering the Group-Based Announcement

Figure 11:
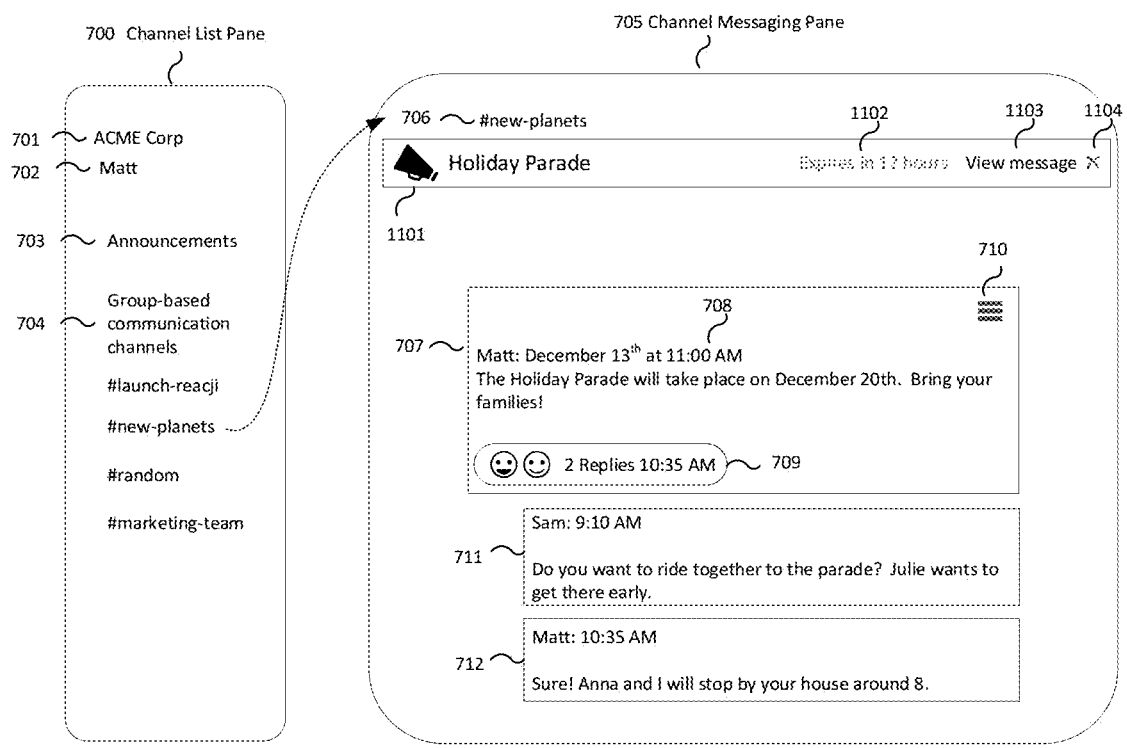

FIG. 11 illustrates an example group-based communication interface having a channel list pane 700 and a channel messaging pane 705 in accordance with some embodiments discussed herein. The channel messaging pane 705 displays a summary of a thread of group-based communication messages from the "new-planets" group-based communication channel. In accordance to FIG. 10, the GBAGM application received an electronic group-based announcement request associated with a user identifier (as shown by the GBAGM interface element 801) and upon submission of the request, the GBAGM application is configured to identify one or more selected group-based communication channels of the plurality of group-based communication channels associated with the user identifier used to facilitate access control for the electronic group-based announcement in the group-based communication system. The GBAGM application is further configured to transmit the electronic group-based announcement for rendering within group-based communication channel interfaces associated with the identified one or more selected group-based communication channels. As illustrated in FIG. 11, the rendered electronic group-based announcement 1101 is shown in FIG. 11. The rendered electronic group-based announcement 1101 may present for display the various group-based messaging communication data elements (e.g., input boxes 1001-1007 of FIG. 10), such as the title ("Holiday Parade"), and the access interval time indicative of a time period during which the announcement is to be available for access control before the announcement is deleted and no longer accessible. In this example, the rendered electronic group-based announcement 1101 is to be available for 12 hours. The rendered electronic group-based announcement 1101 may present for display actions to hide the message 1104 although it will still be accessible as set forth by the access interval time 1102; and an action to view the message 1103 (e.g., view message in its associated group-based communication channel as shown by group-based messaging communications 707, 711, and 712). Depending on the announcement type, the GBAGM application may not facilitate the action to hide the message 1104. In this case the announcement type is set to non-dismissible, that is to say, the user is unable to eliminate the electronic group-based announcement. In other words, the electronic group-based announcement is fixed and cannot be deleted or hidden from the group-based communication channel interface. In some embodiments, the announcement type may be "passive," such that the electronic group-based announcement is rendered for display to a group-based communication channel interface without requiring an active response (e.g., read receipt) from the user.

In some embodiments, the action to view the message 1103 may cause the GBAGM application to display the originating message in the originating channel. For example, upon selection of view message 1103, the GBAGM application is configured to display group-based messaging communication 707 (e.g., originating message) in group-based communication channel 706 (e.g., originating channel). Additionally and in embodiments, the group-based messaging communication 707 that was promoted to an electronic group-based announcement may be presented or displayed in a different style (e.g., different background color from other group-based communication messages, highlighted, bolded, starred, etc.) so as to distinguish or highlight the group-based messaging communication as promoted to an electronic group-based announcement.

Further, as shown in FIG. 11, the rendered electronic group-based announcement 1101 may be presented in a manner designed to garner more collective user-attention than the content item would otherwise receive, if presented in a conventional manner (e.g., as shown by group-based messaging communications 707, 711, and 712). For instance, when the rendered electronic group-based announcement 1101 may be positioned at or near the top of a plurality of group-based communication messages, and/or, by modifying the rendered electronic group-based announcement 1101's presentation format, so that the color, shape or size of the content item (or some part of the content item) is different from the plurality of group-based communication messages.

Figure 12:
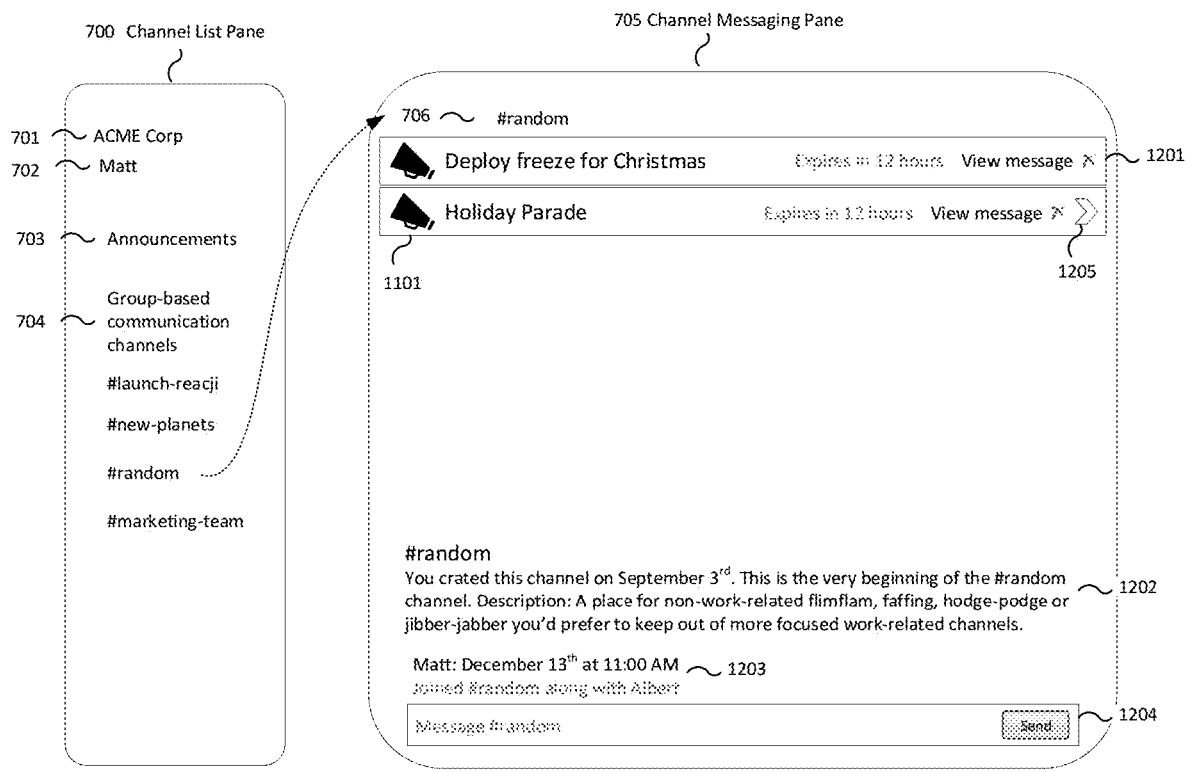

As shown in FIG. 12, the rendered electronic group-based announcement 1101 may be presented in a group-based communication channel (e.g., "random") that is different from the group-based communication channel via which the announcement was originally posted, published and/or presented (e.g., "new-planets). FIG. 12 further illustrates another rendered electronic group-based announcement 1201. In this example, the rendered electronic group-based announcement 1201 is listed above the rendered electronic group-based announcement 1101. If an announcement is being presented in the group-based communication channel, the announcement may be presented more prominently in the channel, for example, by presenting the announcement at or near the top of the channel messaging pane 705. With some embodiments, this may be achieved by selecting and determining a relevance or ranking score for the announcements, where the ranking scores assigned to announcements are used to determine which particular announcement is selected to be presented within the channel messaging pane associated with the group-based communication channel, and in what order.

In some embodiments, the presentation of the announcement may be organized in a such a way to allow a user to easily identify one or more messages relevant to him or her. In an example embodiment, each electronic group-based announcement displayed on the channel messaging pane or the channel messaging pane itself may include a user input element 1205 as shown in FIG. 12 that is engageable by the user via the group-based communication interface of the client device. For example, the user input element 1205 includes an interface object that is engageable by the user to organize the electronic group-based announcements by "scrolling" through a plurality of electronic group-based announcements. As used herein, the term "scrolling" or "scroll" refers to moving between a plurality of electronic group-based announcements so that each electronic group-based announcement can be scrolled into view and selected from the list. For example, selecting user input element 1205 will automatically scroll through the plurality of electronic group-based announcements to display within the channel messaging page the announcement beyond the right edge of the electronic group-based announcement 1101 of FIG. 12.

In another example embodiment, the electronic group-based announcement may include another user input element that is engageable by the user to organize presentation of the electronic group-based announcement by moving the electronic group-based announcement "up" or "down" the list. For example, the GBAGM application may receive an input selection in response to user engagement of one of the one or more electronic group-based announcements and then organize the one or more electronic group-based announcements in response to the input selection. The input selection may include scrolling, moving, filtering, categorizing, or sorting the announcements. In an example embodiment, the GBAGM application may organize announcements by filtering messages using social relationship information. For example, a user of the GBAGM application may request to view announcements created by friends. As such, the GBAGM application accesses the announcements to identify announcements that indicate the social relationship "friends" and may highlight or prioritize announcements created by friends. The GBAGM application may further organize announcements tagged with other social relationships (e.g., not friends) as lower in priority (e.g., displayed towards the end of the announcements listing).

In yet another example embodiment, a user, via the group-based communication interface, may enter a search query for a particular announcement to which GBAGM application determines that content or metadata of the one or more electronic group-based announcements does not include content or metadata that matches at least one query term from the search query. As such, the GBAGM application forgoes rendering the respective one or more electronic group-based announcements in the announcement interface element or the group-based communication channel interfaces.

In another example embodiment, the GBAGM application may be configured to organize the one or more electronic group-based announcements by filtering the one or more electronic group-based announcements based on an importance level associated with the one or more selected group-based communication channels. For example, announcements may be sorted from most important to least important, or vice versa, based on their respective group-based communication channel calculated importance levels. For example, the GBAGM application may determine an importance level for the group-based communication channel based on the user's level of engagement with the group-based communication channel (e.g., posting messages within the channel) or whether the user is an administrator role of the group-based communication channel.

In embodiments, the GBAGM application may cause the electronic group-based announcement to be eligible for presentation to a wider audience of users than the electronic group-based announcement would otherwise be eligible for presentation. For example, in many instances, when a user is browsing or viewing group-based communication messages via a particular group-based communication channel, the group-based communication messages presented are generated by users to whom the viewer or browsing user is connected (e.g., members of the particular group-based communication channel). In some instances, the electronic group-based announcement may become eligible for presentation to users who would otherwise not receive or have access to the electronic group-based announcement. For example and as depicted in FIG. 13, the electronic group-based announcement may be presented to users who are not members of the particular group-based communication channel, but are following a broader group-based communication channel 706 ("announcements").

Figure 13:
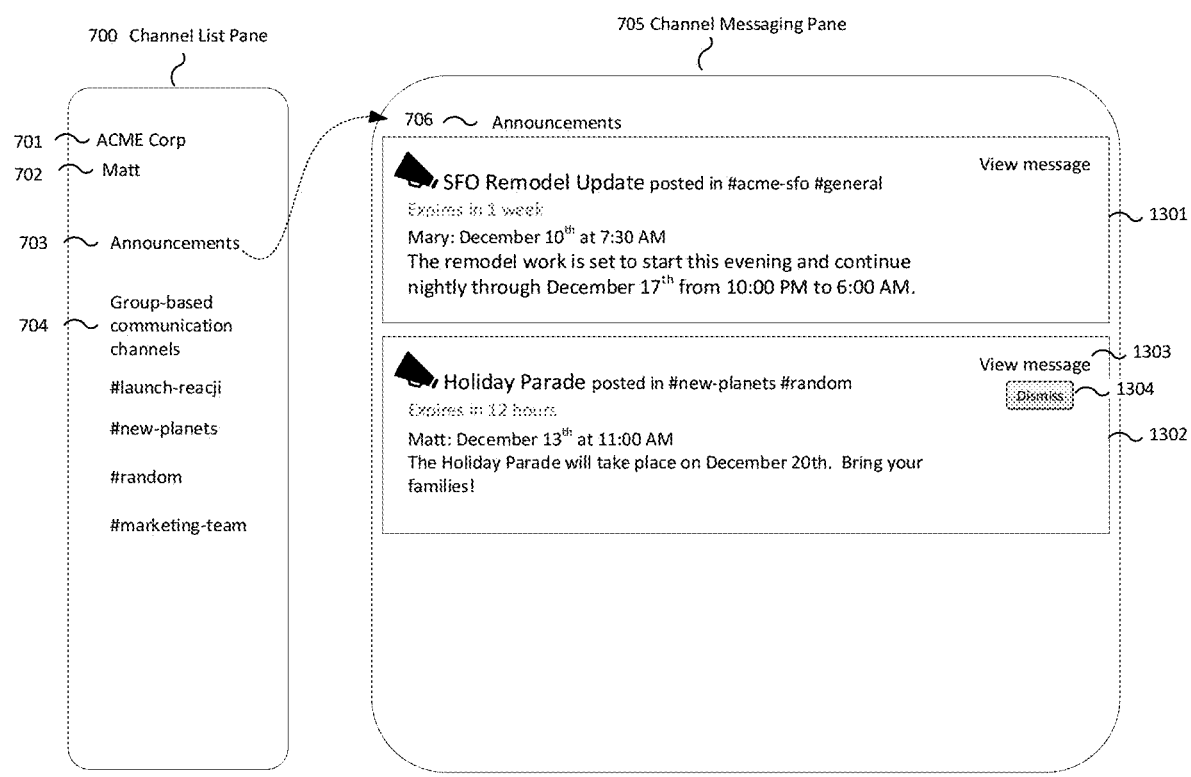

In FIG. 13, the channel messaging pane 705 includes the name of the group-based communication channel 706 ("announcements"). In the embodiment illustrated in FIG. 13 the name of the group-based communication channel can be configured as a selected channel view actuator to initiate a selected channel view request. For instance, in the embodiment illustrated in FIG. 13, selection of the name of the group-based communication channel (e.g., "announcements 703") can be configured to initiate a selected channel view request to view the group-based communication channel 706 "announcements" (e.g., as shown in FIG. 13 in the channel messaging pane 705).

The electronic group-based announcements 1301 and 1302 may present for display the title, body, group-based communication channels (e.g., "new-planets," "random"), access interval time, a profile identifier, the time and date of receipt of the respective electronic group-based announcement, and actions to hide the message 1304 although it will still be accessible as set forth by the access interval time; and an action to view the message 1303 (e.g., view message in its associated group-based communication channel as shown by group-based messaging communications 707, 711, and 712 of FIG. 7).

Figure 14:
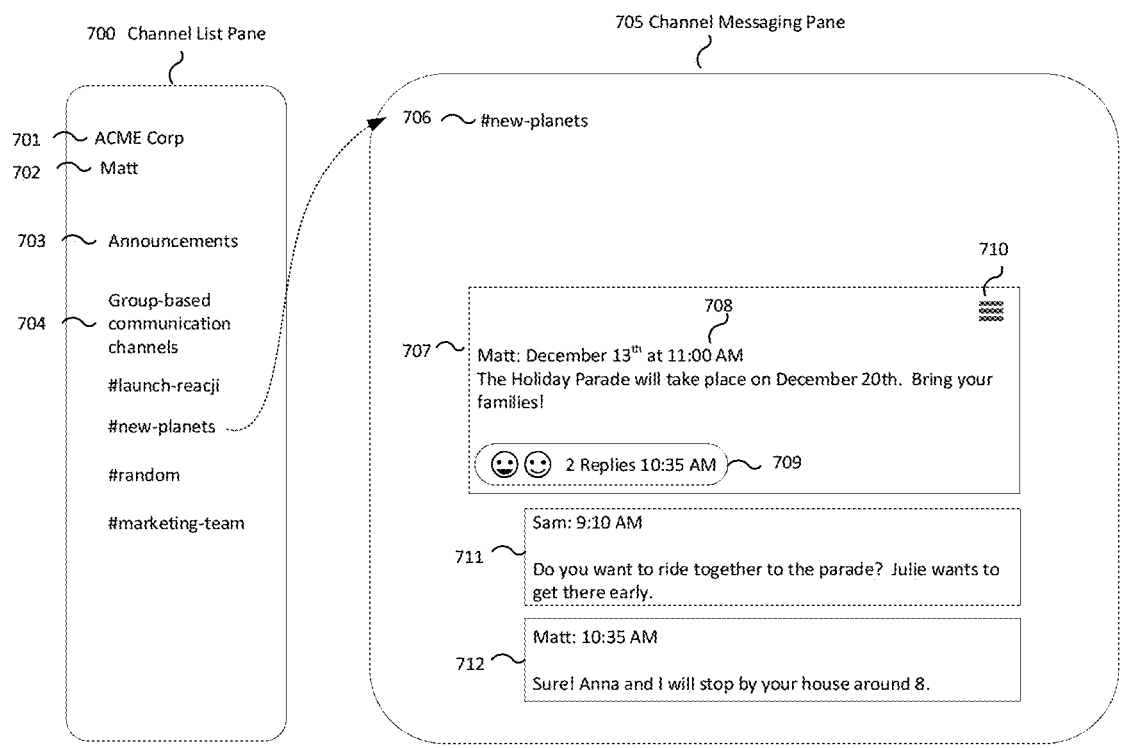
Figure 15:
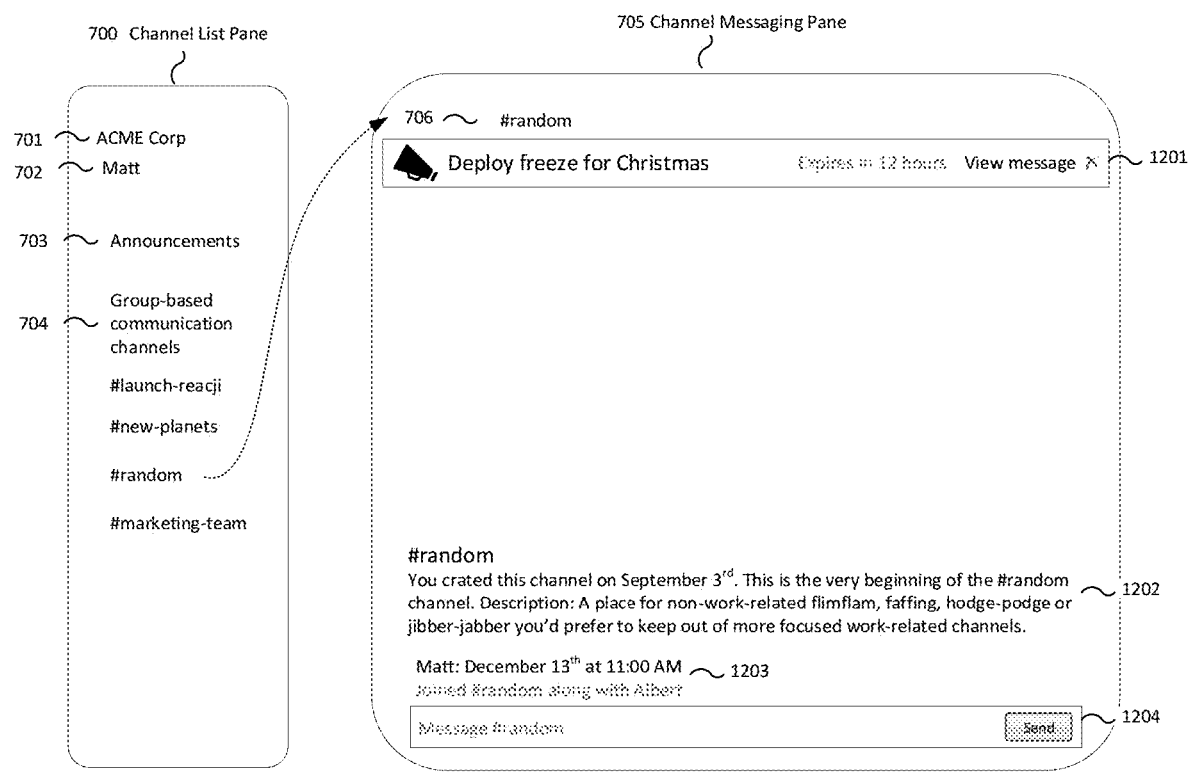

As described above each rendered electronic group-based announcement will present an action to hide the message 1304. In response to the hide request, the group-based communication interface will modify the channel messaging pane 705 to remove the respective electronic group-based announcement. FIGS. 14 and 15 illustrate example channel messaging pane 705 involving receipt of a hide request. As shown in FIG. 14, the group-based communication interface is configured to remove the rendered electronic group-based announcement 1101 previously shown in FIG. 11. In some embodiments, the GBAGM application allows users to search for the removed electronic group-based announcement using a search actuator initiating a search request. In response to a search request, the group-based communication interface will display applicable electronic group-based announcements. The electronic group-based announcements can then be viewed in full by selecting a selected announcement view actuator. The selected electronic group-based announcements may be displayed in a channel messaging pane 705. FIG. 15 shows another example where the group-based communication interface is configured to remove the rendered electronic group-based announcement 1101 as previously shown in FIG. 12. FIG. 15 displays electronic group-based announcement 1201.

Figure 16:
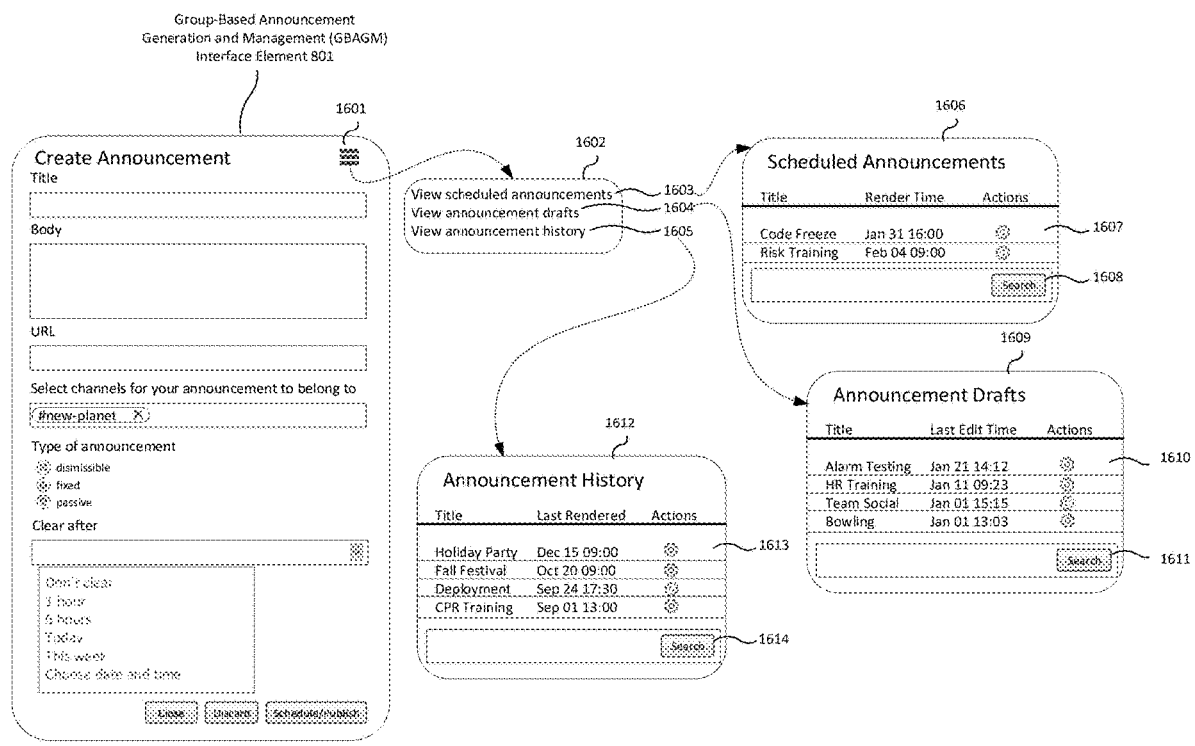

In the embodiment illustrated in FIG. 16, an announcement option actuator 1601 is provided for display within the GBAGM interface element 801. Upon selecting the announcement option actuator 1601, an announcement options interface element 1602 is shown which may be overlaid the GBAGM interface element 801. The announcement options interface element 1602 includes various actions associated with electronic group-based announcements associated with a user identifier, such as viewing scheduled announcements 1603, viewing announcement drafts 1604, and viewing announcements history 1605. As shown in FIG. 16, upon user selection of view scheduled announcement 1603, the GBAGM application may generate for display a scheduled announcement modal window 1606 which is configured to display a list of scheduled announcements. Each scheduled announcement 1607 may include announcement data, such as title and scheduled render time, and actions to edit the respective announcement data. The scheduled announcement modal window 1606 may further provide a search actuator 1608 to search for a particular scheduled announcement.

The GBAGM application is further configured to generate for display an announcement drafts modal window 1609 upon user selection of the view announcement drafts element 1604. The announcement drafts modal window 1609 includes a listing of announcement drafts (e.g., saved announcement drafts). Each announcement draft 1610 in the list displays information related to the announcement title, last edit time information, and actions to edit the respective announcement data. The announcement drafts modal window 1609 may further provide a search actuator 1611 to search for a particular announcement draft.

In embodiments, upon user selection of view announcement history 1605, the GBAGM application may generate for display an announcement history modal window 1612 which is configured to display a list of already rendered announcements. Each announcement 1613 may include announcement data, such as title and the last rendered time, and actions to edit the announcement data. In this embodiment, the GBAGM application may be configured to provide previously rendered announcements for re-posting to a group-based communication channel interface. The announcement history modal window 1612 may further provide a search actuator 1614 to search for a particular scheduled announcement.

In another embodiment, the GBAGM application is further configured to, prior to transmitting the electronic group-based announcement for rendering, compare the group-based messaging communication data element against data elements associated with rendered electronic group-based announcements and in response to a determination that the electronic group-based announcement comprises potentially duplicate content based on the comparison, transmit information identifying that the electronic group-based announcement and the rendered electronic group-based announcements comprise potentially duplicate content.

Conclusion

Many modifications and other embodiments of the disclosures set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus configured to generate an electronic group-based announcement in a group-based communication system, the apparatus comprising at least one processor and at least one memory including a computer program code, the at least one memory and the computer program code configured to, with the at least one processor, cause the apparatus to:

receive an electronic group-based announcement request associated with a user identifier and the electronic group-based announcement, the electronic group-based announcement request comprising at least one group-based messaging communication data element;

transmit, for rendering at a client device corresponding to the user identifier, a channel list pane and a channel messaging pane, the channel list pane comprising an announcement thread indication and a plurality of group-based communication channel indications associated with the user identifier, and the channel messaging pane comprising, within a channel interface for a first channel, a candidate list indicating the first channel to which the electronic group-based announcement is to be posted and a plurality of group-based communication channels associated with the user identifier, a type of announcement input field, and an access interval time input field;

receive one or more user inputs selecting one or more additional group-based communication channels of the plurality of group-based communication channels for the electronic group-based announcement request, selecting an electronic group-based announcement type, and indicating an access interval time;

identify one or more selected group-based communication groups associated with the user identifier to facilitate access control for the electronic group-based announcement;

determine, from the at least one group-based messaging communication data element, a target criteria that defines whether the electronic group-based announcement is transmitted for rendering within group-based communication channel interfaces associated with the first channel and the selected one or more additional group-based communication channels, the identified one or more selected group-based communication groups, or an announcement thread of the group-based communication system, wherein to transmit the electronic group-based announcement for rendering within the group-based communication channel interfaces associated with the first channel and the selected one or more additional group-based communication channels, the identified one or more selected group-based communication groups, or the announcement thread of the group-based communication system is further based, at least in part, on the target criteria being satisfied by the at least one group-based messaging communication data element;

prior to transmitting the electronic group-based announcement for rendering within the channel messaging pane, compare the at least one group-based messaging communication data element against data elements associated with rendered electronic group-based announcements;

in response to a determination that the electronic group-based announcement comprises potentially duplicate content based on the comparison, transmit information identifying that the electronic group-based announcement and the rendered electronic group-based announcements comprise the potentially duplicate content;

transmit the electronic group-based announcement for rendering within the channel messaging pane, wherein the group-based communication system is configured to transmit the electronic group-based announcement for rendering in response to a first user selection, via the channel list pane, of a group-based communication channel indication indicating a channel of the first channel and the selected one or more additional group-based communication channels and is configured to transmit the electronic group-based announcement for rendering with an indication of the first channel and the selected one or more additional group-based communication channels in response to a second user selection, via the channel list pane, of the announcement thread indication;

transmit the electronic group-based announcement for rendering within the group-based communication channel interfaces associated with the identified one or more selected group-based communication groups or the announcement thread of the group-based communication system, wherein the electronic group-based announcement is rendered based at least in part on group publish control parameters;

receive a hide request for the electronic group-based announcement based at least in part on the electronic group-based announcement type; and in response to the hide request, remove the electronic group-based announcement from the rendering within the channel messaging pane, wherein the electronic group-based announcement remains accessible after receiving the hide request based at least in part on the access interval time.

2. The apparatus of claim 1, wherein the user identifier is associated with group-based messaging communications transmitted to one or more of the plurality of group-based communication channels.

3. The apparatus of claim 1, wherein the electronic group-based announcement is rendered based at least in part on publish control parameters, the publish control parameters comprising approval information representing one or more entities whose approval is needed prior to transmitting the electronic group-based announcement for rendering within the channel messaging pane.

4. The apparatus of claim 1, wherein the announcement thread comprises one or more electronic group-based announcements that are engageable by a user, wherein the at least one memory and the computer program code are configured to, with the at least one processor, further cause the apparatus to:
   receive an input selection in response to user engagement of one of the one or more electronic group-based announcements; and
   organize the one or more electronic group-based announcements in response to the input selection.

5. The apparatus of claim 4, wherein organizing the one or more electronic group-based announcements comprises filtering the one or more electronic group-based announcements based on an importance level associated with the first channel and the selected one or more additional group-based communication channels.

6. The apparatus of claim 4, wherein organizing the one or more electronic group-based announcements comprises determining that content or metadata of a set of the one or more electronic group-based announcements does not include content or metadata that matches at least one query term from a search query and forgoing rendering the set of the one or more electronic group-based announcements in the announcement thread.

7. The apparatus of claim 1, wherein the group publish control parameters comprises approval information representing one or more entities whose approval is needed prior to transmitting the electronic group-based announcement for rendering within the group-based communication channel interfaces associated with the identified one or more selected group-based communication groups or the announcement thread of the group-based communication system.

8. The apparatus of claim 1, wherein the at least one memory and the computer program code are configured to, with the at least one processor, further cause the apparatus to:
   terminate access to the electronic group-based announcement based at least in part on the access interval time for the electronic group-based announcement.

9. The apparatus of claim 1, wherein the at least one memory and the computer program code are configured to, with the at least one processor, further cause the apparatus to:
   receive a search request; and
   in response to the search request, transmit for display one or more electronic group-based announcements applicable to the search request, wherein the one or more electronic group-based announcements comprises the electronic group-based announcement removed from the rendering within the channel messaging pane in response to the hide request based at least in part on the electronic group-based announcement remaining accessible after receiving the hide request.

10. The apparatus of claim 1, wherein the electronic group-based announcement type is dismissible or passive and the hide request is received based at least in part on the electronic group-based announcement type being dismissible or passive.

11. The apparatus of claim 1, wherein the first channel and the selected one or more additional group-based communication channels are distinct from the announcement thread indication.

12. A method for generating an electronic group-based announcement in a group-based communication system, the method comprising:
   receiving an electronic group-based announcement request associated with a user identifier and the electronic group-based announcement, the electronic group-based announcement request comprising at least one group-based messaging communication data element;
   transmitting, for rendering at a client device corresponding to the user identifier, a channel list pane and a channel messaging pane, the channel list pane comprising an announcement thread indication and a plurality of group-based communication channel indications associated with the user identifier, and the channel messaging pane comprising, within a channel interface for a first channel, a candidate list indicating the first channel to which the electronic group-based announcement is to be posted and a plurality of group-based communication channels associated with the user identifier, a type of announcement input field, and an access interval time input field;
   receiving one or more user inputs selecting one or more additional group-based communication channels of the plurality of group-based communication channels for the electronic group-based announcement request, selecting an electronic group-based announcement type, and indicating an access interval time;
   identifying one or more selected group-based communication groups associated with the user identifier to facilitate access control for the electronic group-based announcement;
   determining, from the at least one group-based messaging communication data element, a target criteria that defines whether the electronic group-based announcement is transmitted for rendering within group-based communication channel interfaces associated with the first channel and the selected one or more additional group-based communication channels, the identified one or more selected group-based communication groups, or an announcement thread of the group-based communication system, wherein to transmit the electronic group-based announcement for rendering within the group-based communication channel interfaces associated with the first channel and the selected one or more additional group-based communication channels, the identified one or more selected group-based communication groups, or the announcement thread of the group-based communication system is further based, at least in part, on the target criteria being satisfied by the at least one group-based messaging communication data element;
   prior to transmitting the electronic group-based announcement for rendering within the channel messaging pane, comparing the at least one group-based messaging communication data element against data elements associated with rendered electronic group-based announcements;
   in response to a determination that the electronic group-based announcement comprises potentially duplicate content based on the comparison, transmitting information identifying that the electronic group-based announcement and the rendered electronic group-based announcements comprise the potentially duplicate content;

transmitting the electronic group-based announcement for rendering within the channel messaging pane, wherein the group-based communication system is configured to transmit the electronic group-based announcement for rendering in response to a first user selection, via the channel list pane, of a group-based communication channel indication indicating a channel of the first channel and the selected one or more additional group-based communication channels and is configured to transmit the electronic group-based announcement for rendering with an indication of the first channel and the selected one or more additional group-based communication channels in response to a second user selection, via the channel list pane, of the announcement thread indication;

transmitting the electronic group-based announcement for rendering within the group-based communication channel interfaces associated with the identified one or more selected group-based communication groups or the announcement thread of the group-based communication system, wherein the electronic group-based announcement is rendered based at least in part on group publish control parameters;

receiving a hide request for the electronic group-based announcement based at least in part on the electronic group-based announcement type; and in response to the hide request, removing the electronic group-based announcement from the rendering within the channel messaging pane, wherein the electronic group-based announcement remains accessible after receiving the hide request based at least in part on the access interval time.

13. The method of claim 12, wherein the user identifier is associated with group-based messaging communications transmitted to one or more of the plurality of group-based communication channels.

14. A computer program product comprising a non-transitory computer-readable medium having computer program instructions stored therein, the computer program instructions when executed by a processor, cause the processor to:

receive an electronic group-based announcement request associated with a user identifier and an electronic group-based announcement, the electronic group-based announcement request comprising at least one group-based messaging communication data element;

transmit, for rendering at a client device corresponding to the user identifier, a channel list pane and a channel messaging pane, the channel list pane comprising an announcement thread indication and a plurality of group-based communication channel indications associated with the user identifier, and the channel messaging pane comprising, within a channel interface for a first channel, a candidate list indicating the first channel to which the electronic group-based announcement is to be posted and a plurality of group-based communication channels associated with the user identifier, a type of announcement input field, and an access interval time input field;

receive one or more user inputs selecting one or more additional group-based communication channels of the plurality of group-based communication channels for the electronic group-based announcement request, selecting an electronic group-based announcement type, and indicating an access interval time;

identify one or more selected group-based communication groups associated with the user identifier to facilitate access control for the electronic group-based announcement;

determine, from the at least one group-based messaging communication data element, a target criteria that defines whether the electronic group-based announcement is transmitted for rendering within group-based communication channel interfaces associated with the first channel and the selected one or more additional group-based communication channels, the identified one or more selected group-based communication groups, or an announcement thread of a group-based communication system, wherein to transmit the electronic group-based announcement for rendering within the group-based communication channel interfaces associated with the first channel and the selected one or more additional group-based communication channels, the identified one or more selected group-based communication groups, or the announcement thread of the group-based communication system is further based, at least in part, on the target criteria being satisfied by the at least one group-based messaging communication data element;

prior to transmitting the electronic group-based announcement for rendering within the channel messaging pane, compare the at least one group-based messaging communication data element against data elements associated with rendered electronic group-based announcements;

in response to a determination that the electronic group-based announcement comprises potentially duplicate content based on the comparison, transmit information identifying that the electronic group-based announcement and the rendered electronic group-based announcements comprise the potentially duplicate content;

transmit the electronic group-based announcement for rendering within the channel messaging pane, wherein the group-based communication system is configured to transmit the electronic group-based announcement for rendering in response to a first user selection, via the channel list pane, of a group-based communication channel indication indicating a channel of the first channel and the selected one or more additional group-based communication channels and is configured to transmit the electronic group-based announcement for rendering with an indication of the first channel and the selected one or more additional group-based communication channels in response to a second user selection, via the channel list pane, of the announcement thread indication;

transmit the electronic group-based announcement for rendering within the group-based communication channel interfaces associated with the identified one or more selected group-based communication groups or the announcement thread of the group-based communication system, wherein the electronic group-based announcement is rendered based at least in part on group publish control parameters;

receive a hide request for the electronic group-based announcement based at least in part on the electronic group-based announcement type; and in response to the hide request, remove the electronic group-based announcement from the rendering within the channel messaging pane, wherein the electronic group-based announcement remains accessible after receiving the hide request based at least in part on the access interval time.

15. The computer program product of claim 14, wherein the user identifier is associated with group-based messaging communications transmitted to one or more of the plurality of group-based communication channels.

* * * * *